United States Patent
Takami et al.

(10) Patent No.: US 7,632,201 B2
(45) Date of Patent: Dec. 15, 2009

(54) HYBRID DRIVE APPARATUS

(75) Inventors: Shigeki Takami, Anjo (JP); Tomoo Atarashi, Anjo (JP); Hirotaka Yata, Anjo (JP); Makoto Iwanaka, Anjo (JP); Takuma Kakinami, Toyota (JP); Yasuo Hojo, Nagoya (JP); Masahiro Kojima, Okazaki (JP); Ryuji Ibaraki, Nishikamo-gun (JP); Atsushi Tabata, Toyota (JP); Yuji Iwase, Mishima (JP); Tooru Matsubara, Toyota (JP); Hiroyuki Shibata, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 488 days.

(21) Appl. No.: 11/586,581

(22) Filed: Oct. 26, 2006

(65) Prior Publication Data

US 2007/0107960 A1 May 17, 2007

(30) Foreign Application Priority Data

Oct. 26, 2005 (JP) ............................ 2005-311608
Apr. 27, 2006 (JP) ............................ 2006-124239

(51) Int. Cl.
*F16H 3/72* (2006.01)
(52) U.S. Cl. ........................................................ 475/5
(58) Field of Classification Search ................. 475/5, 475/280, 151
See application file for complete search history.

(56) References Cited

U.S. PATENT DOCUMENTS

| 5,533,945 | A | * | 7/1996 | Martin et al. ................ 475/276 |
| 7,223,200 | B2 | * | 5/2007 | Kojima et al. ................. 477/3 |
| 2004/0084233 | A1 | * | 5/2004 | Wakuta et al. ............ 180/65.2 |
| 2005/0115750 | A1 | | 6/2005 | Takami et al. |
| 2005/0209760 | A1 | * | 9/2005 | Tabata et al. ................. 701/53 |
| 2007/0021258 | A1 | * | 1/2007 | Conlon ......................... 475/5 |
| 2007/0155583 | A1 | * | 7/2007 | Tabata et al. ................ 477/37 |
| 2008/0004156 | A1 | * | 1/2008 | Tabata et al. ................. 477/3 |
| 2008/0009388 | A1 | * | 1/2008 | Tabata et al. ................. 477/2 |

FOREIGN PATENT DOCUMENTS

| JP | A-51-49364 | 4/1976 |
| JP | A-61-244945 | 10/1986 |
| JP | A-63-243551 | 10/1988 |
| JP | A-2000-346187 | 12/2000 |
| JP | A-2002-349647 | 12/2002 |
| JP | A 2005-061498 | 3/2005 |
| JP | A-2005-162002 | 6/2005 |
| JP | A 2005-206136 | 8/2005 |

* cited by examiner

*Primary Examiner*—Sherry Estremsky
(74) *Attorney, Agent, or Firm*—Oliff & Berridge, PLC

(57) ABSTRACT

A hybrid drive apparatus including an input shaft; a first motor and a second motor; a power distributing planetary gear; an intermediate transmission shaft; and a partition wall provided between a motor part including the first motor and the second motor and a transmission part including the transmission such that the intermediate shaft passes through the partition wall.

19 Claims, 13 Drawing Sheets

|  | C1 | C2 | C3 | B1 | B2 | F1 |
|---|---|---|---|---|---|---|
| 1ST | ○ |  |  |  | (○) | ○ |
| 2ND | ○ |  |  | ○ |  |  |
| 3RD | ○ | ○ |  |  |  |  |
| 4TH |  | ○ |  | ○ |  |  |
| REV |  |  | ○ |  | ○ |  |

1ST

2ND

3RD

4TH

REV

|      | C1 | C2 | C3 | B1 | B2  | F1 |
|------|----|----|----|----|-----|----|
| REV  |    |    | O  |    | O   |    |
| 1ST  | O  |    |    |    | (O) | O  |
| 2ND  | O  |    |    | O  |     |    |
| 3RD  | O  |    | O  |    |     |    |
| 4TH  | O  | O  |    |    |     |    |
| 5TH  |    | O  | O  |    |     |    |
| 6TH  |    | O  |    | O  |     |    |

|      | C1 | C2 | C3 | C4 | B1 | B2  | F1 |
|------|----|----|----|----|----|-----|----|
| REV1 |    |    | O  |    |    | O   |    |
| REV2 |    |    |    | O  |    | O   |    |
| 1ST  | O  |    |    |    |    | (O) | O  |
| 2ND  | O  |    |    | O  |    |     |    |
| 3RD  | O  |    | O  |    |    |     |    |
| 4TH  | O  |    |    | O  |    |     |    |
| 5TH  | O  | O  |    |    |    |     |    |
| 6TH  |    | O  |    | O  |    |     |    |
| 7TH  |    | O  | O  |    |    |     |    |
| 8TH  |    | O  |    |    | O  |     |    |

HYBRID DRIVE APPARATUS

The disclosures of Japanese Patent Application No. 2005-311608 filed on Oct. 26, 2005 and Japanese Patent Application No. 2006-124239 filed on Apr. 27, 2006, including the specifications, drawings and abstracts are incorporated herein by reference in their entirety.

BACKGROUND

The present invention relates to a hybrid drive apparatus.

As disclosed in Japanese Patent Application Publication No. JP-A-2005-61498, there exists a hybrid drive apparatus that is structured such that a first motor, a power distributing planetary gear, a second motor, and a transmission are provided in a drive transmission system from a side of an input shaft disposed on an engine side to an output shaft side.

In this hybrid drive apparatus, excessive or deficient torque on the output side can be compensated for by the second motor while maintaining the rotation speed of the engine in a state of high fuel efficiency through the actions of the first motor.

Japanese Patent Application Publication No. JP-A-2005-61498 proposes a hybrid drive apparatus in which a transmission, including three shift speeds, is interposed between a second rotary shaft, which rotates integrally with the second motor, and a drive shaft for outputting power, whereby shifting can be performed without reducing the power transfer efficiency.

Japanese Patent Application Publication No. JP-A-2005-206136 provides a switch clutch and a switch brake as a differential state switching apparatus for selectively switching a power distribution mechanism between an operational state (continuously variable shifting state) in which the power distribution mechanism can operate as an electric continuously variable transmission, and a constant shifting state in which the power distribution mechanism can operate as a transmission having a constant speed ratio. As a result, a hybrid drive apparatus having a reduced size and improved fuel efficiency is obtained. In Japanese Patent Application Publication No. JP-A-2005-206136, a transmission that is capable of realizing between four and eight forward speeds and one or two reverse speeds is employed.

SUMMARY

With the technique disclosed in Japanese Patent Application Publication No. JP-A-2005-61498, drive is received as the transmission input following power distribution using a differential gear mechanism, and the output following shifting is transferred to a drive wheel. However, there are only three shift speeds, and the top speed can only be realized in a direct coupling state in which the rotation speed of the output shaft is identical to the rotation speed of the input shaft within the transmission. Hence, there is room for further improvements in fuel efficiency in the high speed region (high speed fuel efficiency).

With the technique disclosed in Japanese Patent Application Publication No. JP-A-2005-206136, the output of a low speed state (underdrive state) can be obtained in relation to the engine rotation speed, and hence a comparative improvement in acceleration performance can be achieved in the low speed region in which traction is required. Further, by locking one of the gear elements of a power distribution mechanism for distributing the power of the engine, the rotation speed of a rotary shaft, which is input into the transmission, can be increased in relation to the engine rotation speed. By transferring this increased rotation speed to the transmission output shaft at the same speed, energy conversion loss can be suppressed, enabling an improvement in fuel efficiency in the high speed region. However, with the technique disclosed in this document, the input rotation speed on the transmission side cannot be increased, and in this state the engine rotation speed cannot be varied continuously. Therefore, the engine cannot be operated on the optimum fuel efficiency line, leading to deterioration of the fuel efficiency. Hence, there is room for improvement in the application of an operational state (continuous speed variation state) enabling the power distribution mechanism to operate as an electric continuously variable transmission, which is otherwise known as a two-motor split system in which one of the rotary elements of a planetary gear is connected to the output shaft of the engine, the other two rotary elements of the planetary gear are connected to a first motor and a transfer shaft coupled to a drive wheel, and a second motor is connected to the transfer shaft.

The present invention thus provides, among other things, a hybrid drive apparatus employing a two-motor split system, which is capable of securing a favorable acceleration performance in a low speed region and achieving high fuel efficiency in a high speed region.

According to a first exemplary aspect of the invention, the hybrid drive apparatus includes an input shaft that is drivingly coupled to an engine and an output shaft that is drivingly coupled to a wheel; a first motor and a second motor; a power distributing planetary gear comprising first, second, and third rotary elements, the first motor being connected to the first rotary element, the input shaft being connected to the second rotary element, and an intermediate transmission shaft and the second motor being connected to the third rotary element; a transmission having a plurality of shift speeds and that outputs power transferred from the intermediate transmission shaft to the output shaft, wherein the plurality of shift speeds of the transmission comprise at least (1) an acceleration shift speed in which a rotation speed of the intermediate transmission shaft is increased and output to the output shaft, and (2) a deceleration shift speed in which the rotation speed of the intermediate transmission shaft is decreased and output to the output shaft; and a partition wall provided between a motor part including the first motor and the second motor and a transmission part including the transmission such that the intermediate shaft passes through the partition wall.

According to a second exemplary aspect of the invention, the hybrid drive apparatus includes an input shaft that is drivingly coupled to an engine and an output shaft that is drivingly coupled to a wheel; a first motor and a second motor; a power distributing planetary gear comprising first, second, and third rotary elements, the first motor being connected to the first rotary element, the input shaft being connected to the second rotary element, and an intermediate transmission shaft and the second motor being connected to the third rotary element; and a transmission having a plurality of shift speeds and that outputs power transferred from the intermediate transmission shaft to the output shaft. The transmission comprises first and second brakes, first, second, and third clutches that transmit rotation of the intermediate transmission shaft, and first, second, third, and fourth rotary elements, and has a shifting planetary gear set comprising a first planetary gear and a second planetary gear, both the first planetary gear and the second planetary gear comprise respective sun gears, carriers, and ring gears thereof, the first rotary element of the shifting planetary gear set is linked to the sun gear of the first planetary gear, the second rotary element of the shifting planetary gear set and the ring gear of the second planetary gear are linked to the carrier of the first planetary gear, the third rotary element of the shifting planetary gear set and the carrier of the second planetary gear are linked to the ring gear of the first planetary gear, the fourth rotary element is linked to the sun gear of the second planetary gear, the first rotary element of the shifting planetary gear set is selectively coupled to the intermediate transmission shaft by the third clutch, and is selectively coupled to a non-rotary member by the first brake, the second rotary element of the shifting planetary gear set is selectively coupled to the intermediate transmission shaft by the second clutch, and is selectively coupled to a non-rotary member by the second brake, the third rotary element of the shifting planetary gear set is capable of outputting an output rotation to the output shaft, and the fourth rotary element is selectively coupled to the intermediate transmission shaft by the first clutch.

BRIEF DESCRIPTION OF THE DRAWINGS

Various embodiments of the invention will be described with reference to the drawings wherein.

DETAILED DESCRIPTION OF EMBODIMENTS

Embodiments of the present invention will now be described on the basis of the drawings.

A hybrid drive apparatus HE includes an input shaft I which receives a driving force from an engine E, and an output shaft O for outputting the driving force to a drive wheel (not shown). In the hybrid drive apparatus HE shown in FIG. 1, the input shaft I and the output shaft O are provided along an axial direction thereof. Needless to say, the present invention is not limited to a structure in which these shafts are provided along the axial direction, and the input shaft and the output shaft may be disposed in parallel or in another desired manner.

Figure 1:
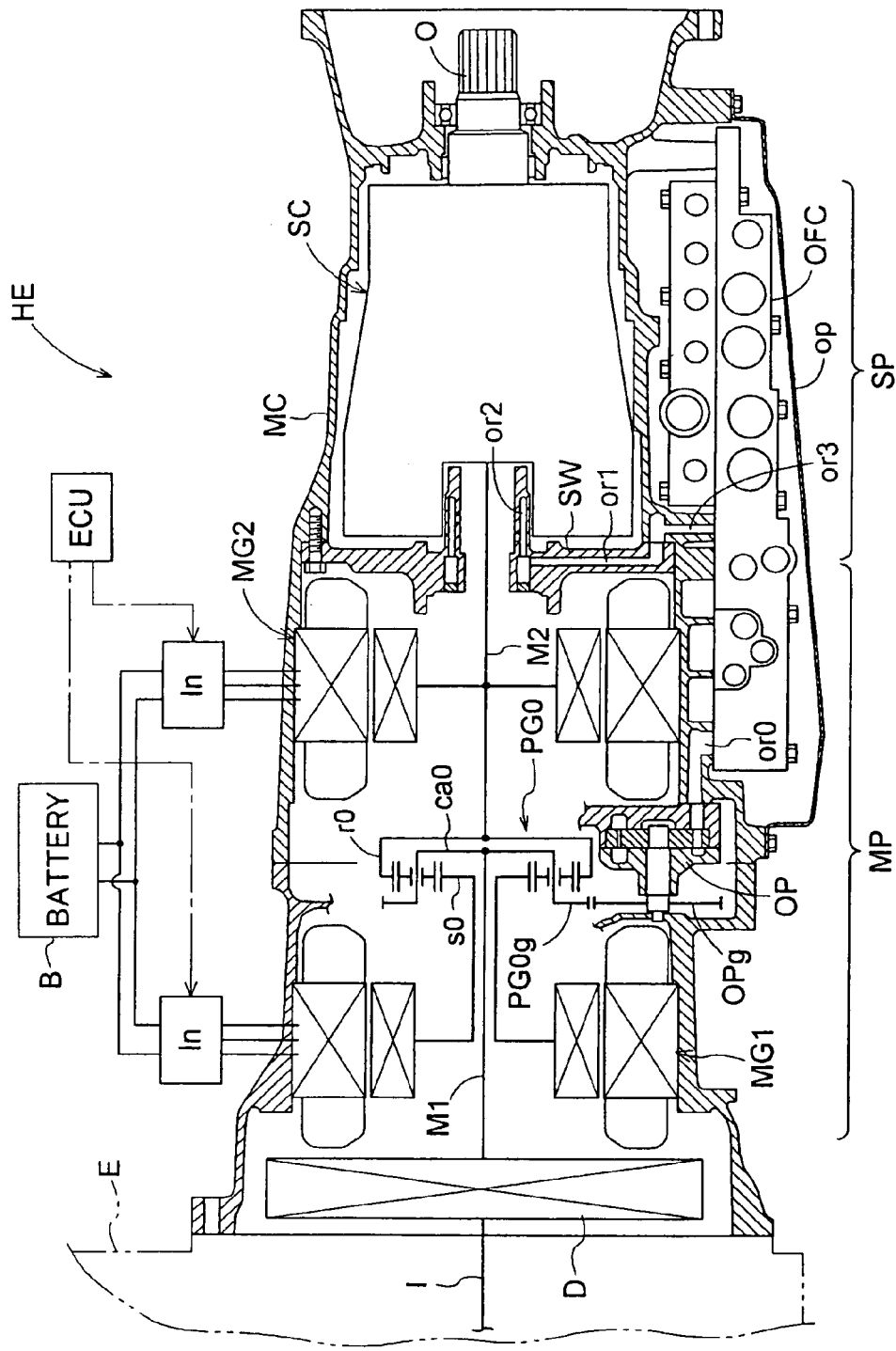
FIG. 1 is a schematic diagram showing the overall structure of a hybrid drive apparatus.

As shown in FIG. 1, a motor part MP provided with motors MG1, MG2 and a power distributing planetary gear PG0 is provided on the input shaft I side, and a transmission part SP provided with a transmission SC is provided on the output shaft O side. A partition wall SW is provided on the boundary between the motor part MP and the transmission part SP. The partition wall SW is separated from the transmission case MC, and is attached to the transmission case MC with fixing bolts from the motor part MP.

In the hybrid drive apparatus HE, the first motor MG1, power distributing planetary gear PG0, and the second motor MG2 are provided in sequence from the input shaft I to the output shaft O, and the transmission SC is provided on the output shaft O side thereof.

These devices are basically accommodated within a transmission case MC whose width in the radial direction decreases steadily from the input shaft I side to the output shaft O side.

A first intermediate shaft M1 and a second intermediate shaft M2 are disposed between and coaxially with the input shaft I and the output shaft O. The input shaft I and the first intermediate shaft M1 are connected via a damper D. Variation in the engine output is absorbed by the damper D and transferred to the first intermediate shaft M1. The first intermediate shaft M1 and the second intermediate shaft M2 are connected via the power distributing planetary gear PG0 so as to be capable of drive transmission. The output shaft O is disposed coaxially with the intermediate shafts M1, M2.

In the present application, the transmission SC realizes a function for transferring a driving rotation speed transmitted to the second intermediate shaft M2 to the output shaft O at the same speed or a different speed. Accordingly, the second intermediate shaft M2 serves as an input element of the transmission SC, and the output shaft O serves as an output element. The input element of the transmission SC is known as an "intermediate transmission shaft." As shift speeds, the transmission SC includes both a deceleration output speed in which the rotation speed of the input element is output at a reduced speed, and an acceleration shift speed, in which the rotation speed of the input element is output at an increased speed.

In the present application, a plurality of embodiments will be described, but each of these embodiments shares the structure on the drive transmission upstream side of the transmission SC (the left side of the partition wall SW on the engine E side in FIG. 1 and so on). Accordingly, in the following description, the structure on the upstream side of the transmission SC will be described first. The structure of the downstream, including the transmission SC, will then be described.

Structure on Drive Transmission Upstream Side of Transmission

Drive transmission from the first intermediate shaft M1 to the second intermediate shaft M2 is performed by providing the first motor MG1, power distributing planetary gear PG0, and the second motor MG2 in sequence from the engine E side to the transmission SC side.

The two motors MG1, MG2 are capable of functioning as both a motor which generates power upon reception of an electric power supply and a generator which generates power upon reception of a motive power supply, and are operated in accordance with a control command from an electronic control unit ECU. The motors MG1, MG2 are each connected electrically to a battery B via an inverter In. As well as being capable of operating as motors upon reception of an electric power supply, the motors MG1, MG2 are capable of storing electric power generated when operating as generators in the battery B, or of transmitting the electric power to the other motor to drive the other motor.

Further, the electronic control unit ECU controls the operational state of friction engagement elements, to be described below, between a state of engagement and a state of disengagement. The electronic control unit ECU controls the friction engagement elements to realize a favorable shift speed in the transmission SC on the basis of the vehicle speed and the driving force (an accelerator depression amount, for example) required by the vehicle, in accordance with a pre-stored speed shift map, for example.

To briefly describe the manner in which the electronic control unit ECU basically controls the two motors MG1, MG2, with respect to the first motor MG1, the rotation speed of the motor MG1 is controlled such that the rotation of the engine E is maintained in an operational state in which the highest fuel efficiency (a state in which the motor MG1 is operated at a rotation speed enabling realization of the highest engine efficiency) can be achieved. With respect to the second motor MG2, the output torque is controlled to satisfy the required torque required by the vehicle.

In the illustrated example, the power distributing planetary gear PG0 employs a single planetary gear including a sun gear s0, a carrier ca0 which supports a pinion rotatably, and a ring gear r0. The first intermediate shaft M1 is connected to the power distributing planetary gear PG0 so as to rotate integrally with the carrier ca0; a rotor of the first motor MG1 is connected to the power distributing planetary gear PG0 so as to rotate integrally with the sun gear s0; and the second intermediate shaft M2 is connected to the power distributing planetary gear PG0 so as to rotate integrally with the ring gear r0. The second intermediate shaft M2 is structured so as to rotate integrally with a rotor of the second motor MG2.

Figure 5:
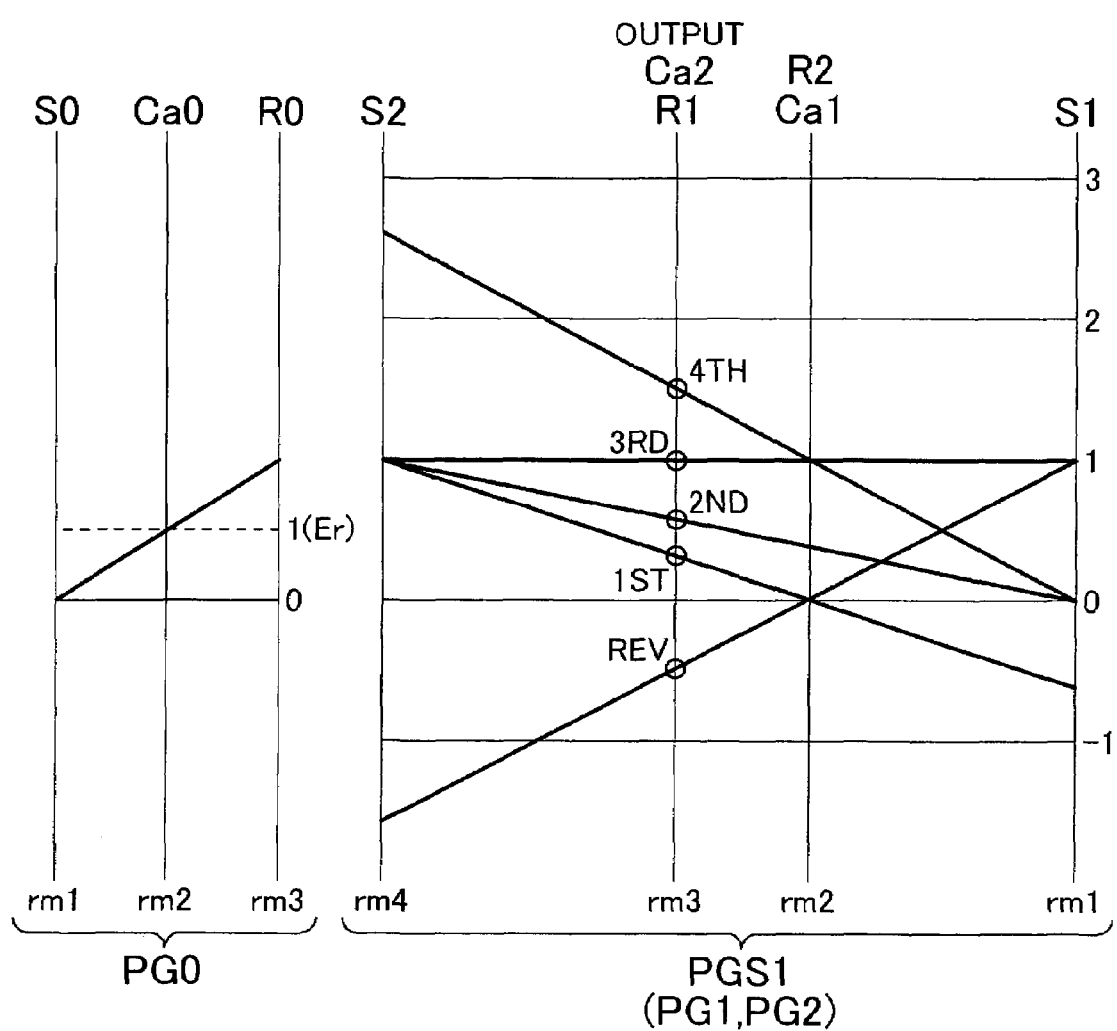
FIG. 5 is a speed diagram of the first embodiment.

The drawing on the left side of FIG. 5 illustrates a speed diagram of the power distributing planetary gear PG0 when the connection structure described above is employed. The drawing on the right side of FIG. 5 corresponds to an operation of a shifting planetary gear set PGS1 provided in a first embodiment to be described below.

In this speed diagram, the ordinate corresponds to the rotation speed of each rotary element. On the ordinate, "0" indicates a rotation speed of zero, with the upper side thereof being positive and the lower side negative. The numerals "1", "2", "−1", and so on denote a ratio to the subject input rotation speed of the planetary gear or planetary gear set. The vertical lines arranged in the horizontal direction correspond to the rotary elements of the subject planetary gear or planetary gear set. The distances between the vertical lines corresponding to respective rotary elements correspond to gear ratios between gears provided to the rotary elements. In the speed diagram, the thick diagonal lines and thick horizontal lines crossing the plurality of vertical lines denote a single operational state of the planetary gear (or planetary gear set).

Returning to the speed diagram on the left side of FIG. 5, a vertical line (denoted as S0) positioned at the left end of the diagram corresponds to a first rotary element (rm1), i.e. the sun gear s0. This rotary element rotates integrally with the rotor of the first motor MG1.

A vertical line (denoted as Ca0) positioned in the center corresponds to a second rotary element (rm2), i.e. the carrier ca0. This rotary element receives drive rotation from the engine E and rotates integrally with the first intermediate shaft M1. The symbol "Er" adjacent to "1" on the ordinate of the diagram indicates that this is the engine rotation speed.

A vertical line (denoted as R0) positioned on the right side corresponds to a third rotary element (rm3), i.e. the ring gear r0. This rotary element rotates integrally with the second intermediate shaft M2 and the rotor of the second motor MG2, which is connected to the second intermediate shaft M2.

In the power distributing planetary gear PG0, the second rotary element rm2 serves as the input element and the third rotary element rm3 serves as the output element. The second intermediate shaft M2 serves as the aforementioned "intermediate transmission shaft."

In the operational state shown in the diagram, the thick diagonal line rises to the right such that in comparison with the rotation speed (corresponding to the engine rotation speed Er) of the carrier ca0 serving as the second rotary element rm2, the sun gear s0 (first rotary element rm1) side is at low speed (zero in the illustrated example) and the ring gear r0 (third rotary element rm3) is at high speed. In other words, the diagram illustrates an overdrive state.

In this operational state, the first motor MG1 receives a reactive force to the engine driving such that the driving force from the engine E is distributed to the first motor MG1 and the second intermediate shaft M2. At this time, the first motor MG1 operates as a generator. Meanwhile, in the overdrive state (when the second intermediate shaft M2 rotates faster than the rotation speed of the engine E), surplus power is transmitted to the second intermediate shaft M2. In the second intermediate shaft M2, the surplus engine driving and the driving force that is increased or decreased by the second motor MG2 is transferred to the transmission SC.

An oil pan OP is attached to the lower side of the outer wall of the transmission case MC. A hydraulic control apparatus OFC is disposed in an oil chamber surrounded by the oil pan OP and the outer wall of the transmission case MC. The hydraulic control apparatus OFC is also referred to as a valve body, and is provided with a plurality of electromagnetic control valves. By activating the electromagnetic control valve, the hydraulic control apparatus OFC controls communication or interruption of an oil passage that connects each portion of the hybrid drive apparatus HE and the oil pump OP. Thereby, the hydraulic control apparatus OFC supplies pressurized oil from the oil pump OP to each part such as the first motor MG1, the second motor MG2, the transmission SC or the like for cooling and lubrication. In addition, the hydraulic control apparatus OFC controls supply or interruption of the pressure oil from the oil pump OP so as to control the operation of engaging and disengaging the friction engagement elements including brakes B1, B2 and clutches C1, C2, C3 of the transmission SC. Here, the oil pump OP is disposed on the lower side in the transmission case MC on the engine E side of the second motor MG2. The oil pump OP shown in the drawings includes a mechanical trochoid pump that is driven by the driving force of the engine E. A driven gear OPg of the oil pump OP is provided such that it meshes with a drive gear PG0g that integrally rotates with the carrier ca0 of the power distributing planetary gear PG0. In addition, the oil pump OP and the hydraulic control apparatus OFC are communicated by an oil passage or0 that is provided in the transmission case MC. Note that an electric motor may be provided (which is not shown in the drawings) for enabling the supply of pressure oil to the hydraulic control apparatus OFC when the engine E is not operated.

A radial direction oil passage or1 and an axial direction oil passage or2 are formed inside the partition wall SW, that are connected to the hydraulic control apparatus OFC. Here, the radial direction oil passage or1 is communicated with the hydraulic control apparatus OFC via an oil passage or3 provided in a stepped portion of the transmission case MC. Thereby, oil can be supplied from the hydraulic control apparatus OFC to an oil passage or4 provided in the second intermediate shaft M2. The oil is supplied from the oil passage or4 in the second intermediate shaft M2 to each part such as the transmission SC, the second motor MG2 and the like. Note that the plurality of radial direction oil passages or1 and the plurality of axial direction oil passages or2 are provided inside the partition wall SW so as to supply the oil to each part of the hybrid drive apparatus HE.

Drive Transmission Downstream of, and Including, the Transmission

In the present application, seven embodiments relating to the structure of the transmission SC will be introduced.

To describe the relationships between the embodiments, the first through fourth and seventh embodiments realize four forward speeds and one reverse speed, while the fifth embodiment realizes six forward speeds and one reverse speed, and the sixth embodiment realizes eight forward speeds and two reverse speeds.

First Embodiment

Figure 2:
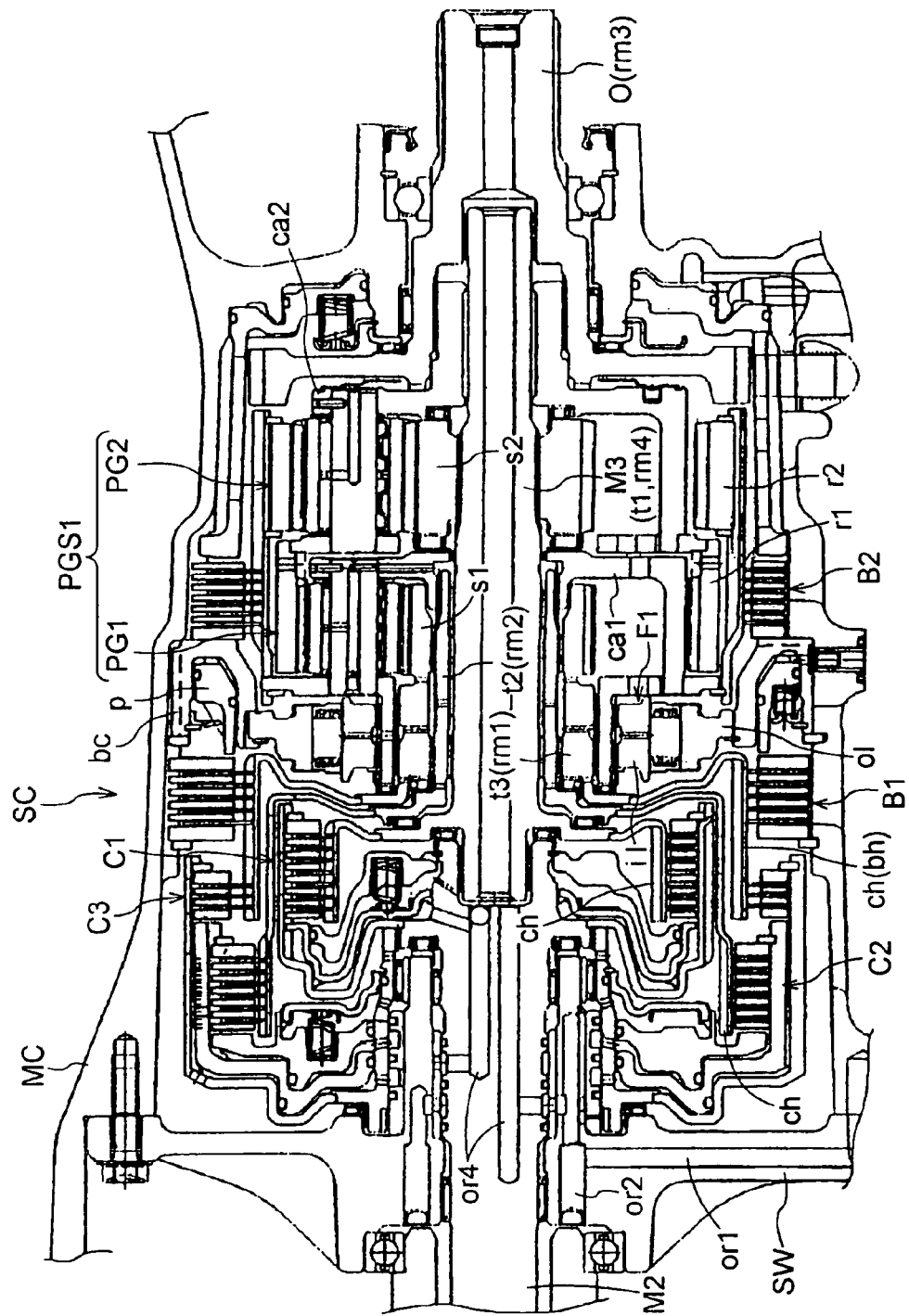
FIG. 2 is a view showing a detailed structure in the vicinity of a transmission of a first embodiment.
Figures 3, 4:
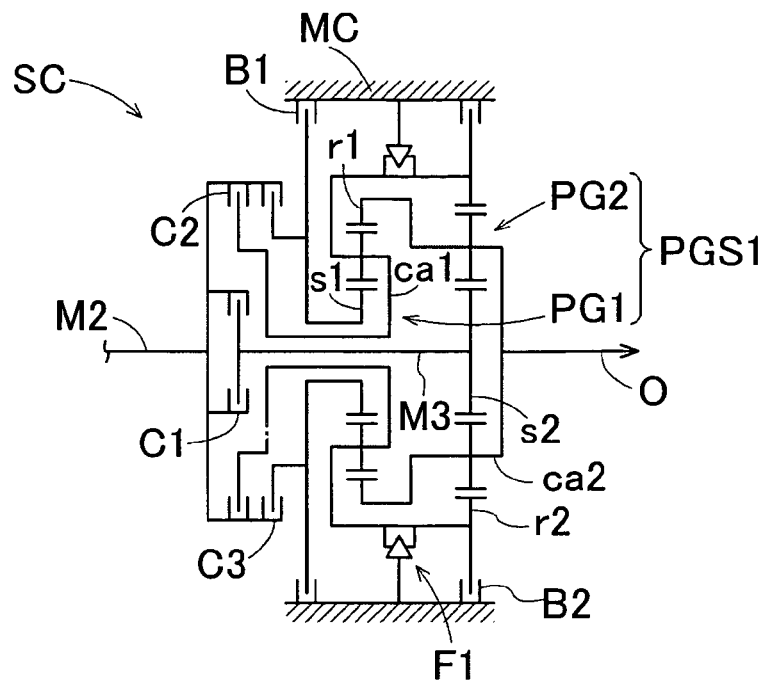
FIG. 3 is a skeleton diagram of the first embodiment.
FIG. 4 is an operation table of the first embodiment.

FIG. 2 shows the specific structure of the downstream side including the transmission in this embodiment, and FIG. 3 shows a skeleton diagram thereof.

As is evident from the drawings, the transmission SC includes a planetary gear set PGS1 constituted by a pair of single planetary gears PG1, PG2, and a plurality of friction engagement elements C1, C2, C3, B1, B2, F1 corresponding to the rotary elements of the planetary gear set PGS1.

A first clutch C1, a second clutch C2, a third clutch C3, a first brake B1, a second brake B2, and a one way clutch F1 are provided as the friction engagement elements. FIG. 4 shows an operation table of the friction engagement elements.

Drive Transmission

Drive transmission will be described below on the basis of the skeleton diagram in FIG. 3, the friction engagement element operation table in FIG. 4, the right side diagram of the speed diagram in FIG. 5, the drive transmission states at each shift speed shown in FIG. 6, and the driving force diagram in FIG. 7.

The pair of planetary gears constituting the planetary gear set PGS1 are provided in sequence from the second intermediate shaft M2 serving as the input member of the transmission SC to the output shaft O, and will be referred to as a first planetary gear PG1 and a second planetary gear PG2. As is also evident from the skeleton diagram, the planetary gears PG1, PG2 are three-element, single planetary gears including sun gears s1, s2, carriers ca1, ca2, and ring gears r1, r2, respectively.

To describe the relationships between the friction engagement elements, the sun gear s1 of the first planetary gear PG1 is selectively fixed to the transmission case MC by the first brake B1. The carrier ca1 of the first planetary gear PG1 is coupled to the ring gear r2 of the second planetary gear PG2 such that the rotation of the second intermediate shaft M2 is selectively transferred thereto by the second clutch C2, and selectively fixed to the transmission case MC by the second brake B2. The rotation of the carrier ca1 is prevented from reversing by the one way clutch F1.

Further, the ring gear r1 of the first planetary gear PG1 is coupled to the carrier ca2 of the second planetary gear PG2 and drivingly coupled to the output shaft O, while the sun gear s2 of the second planetary gear PG2 is structured such that the rotation of the second intermediate shaft M2 is transferred thereto selectively by the first clutch C1.

The sun gear s1 of the first planetary gear PG1 is structured such that the rotation of the second intermediate shaft M2 is transferred thereto selectively by the third clutch C3.

The right side of FIG. 5 shows a speed diagram of the transmission SC. From this speed diagram, it is possible to confirm the existence of members which rotate at a speed ranging approximately from a multiple of −1 to a multiple of 2 relative to the engine rotation speed that may be input into the transmission SC in an overdrive state when a speed shift is performed, depending on the rotary element.

The upper side of the speed diagram shows the correspondence between the respective rotary elements constituting the planetary gears and the vertical lines. "R1, Ca1, S1" denote the ring gear r1, carrier ca1, and sun gear s1 of the first planetary gear PG1, respectively, while "R2, Ca2, S2" denote the ring gear r2, carrier ca2, and sun gear s2 of the second planetary gear PG2, respectively.

To describe the correspondence between the vertical lines and the rotary elements, a rotary element (first rotary element rm1) provided with the sun gear s1 of the first planetary gear PG1, a rotary element (second rotary element rm2) structured so as to rotate integrally with the carrier ca1 of the first planetary gear PG1 and provided with the ring gear r2 of the second planetary gear PG2, a rotary element (third rotary element rm3) provided with the ring gear r1 of the first planetary gear PG1 and structured so as to rotate integrally with the carrier ca2 of the second planetary gear PG2, and a rotary element (fourth rotary element rm4) provided with the sun gear s2 of the second planetary gear PG2, are positioned in sequence from right to left. Hence, in this embodiment, the planetary gear set PGS1 corresponds to a shifting planetary gear set.

The third rotary element rm3 is integrated with the output shaft O, and hence the rotation speed following shifting by the transmission SC can be learned from the position of the circles drawn on the third vertical line from the right, which denotes the output. Subsequent speed diagrams also follow this pattern.

The symbols "$1^{st}$", "$2^{nd}$", "$3^{rd}$", "$4^{th}$", and "REV" are written in relation to the circles on the speed diagram, and correspond to the respective shift states. Here, "$1^{st}$", "$2^{nd}$", "$3^{rd}$", and "$4^{th}$" denote the first, second, third, and fourth forward speeds, respectively, while "REV" denotes the reverse speed. Subsequent speed diagrams also follow this pattern. Incidentally, in FIG. 15 or FIG. 18, the symbols "$5^{th}$ to $8^{th}$", denote fifth through eighth forward speeds, while "REV1" and "REV2" denote a first reverse speed and a second reverse speed, respectively.

As for the ordering of the rotary elements of the planetary gear set PGS1, in the case of forward traveling, the sequence advances from the low speed side to the high speed side, and in the case of reverse traveling, the sequence advances from the high speed side to the low speed side. In either case, the order of the rotary elements does not change.

As is evident from FIG. 3, in this embodiment the relationships between the respective rotary elements of the transmission SC and the respective friction engagement elements are as follows.

The first rotary element rm1 is fixed selectively to the transmission case MC by the first brake B1. Further, the rotation of the second intermediate shaft M2 is transferred selectively to the first rotary element rm1 by the third clutch C3.

The rotation of the second intermediate shaft M2 is transferred selectively to the second rotary element rm2 by the second clutch C2, and the second rotary element rm2 is fixed selectively to the transmission case MC by the second brake B2. The third rotary element rm3 is capable of outputting output rotation to the output shaft O. The rotation of the second intermediate shaft M2 is transferred selectively to the fourth rotary element rm4 by the first clutch C1.

FIG. 4 is an operation table showing the states of the friction engagement elements C1, C2, C3, B1, B2, F1 at each shift speed. In the operation table, a circle indicates that the corresponding friction engagement element is in an engaged state, and a gap indicates that the friction engagement element is in a disengaged state. Further, the circle in parentheses indicates that a substantially identical state to an engaged state is realized in the corresponding friction engagement element B2 by the action of the one way clutch F1.

As shown in the table, in the transmission SC according to the present application, the various speeds are realized by maintaining two friction engagement elements in an engaged state and disengaging the remaining two friction engagement elements at each shift speed.

Shifting

Shifting states in this embodiment, having the above structure, will now be described.

Figure 6:
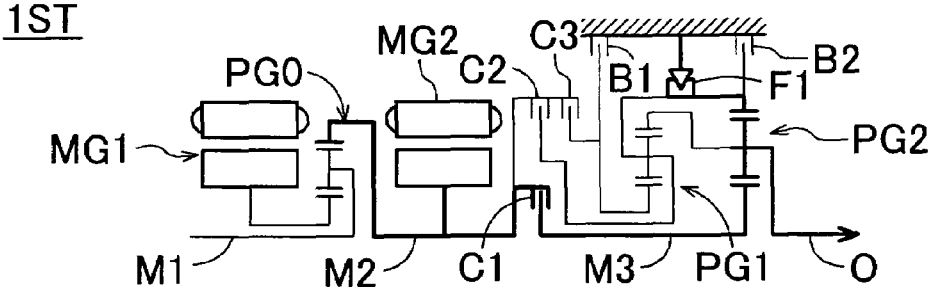
FIG. 6 is an illustrative view of a drive state in the first embodiment.
Figure 6:
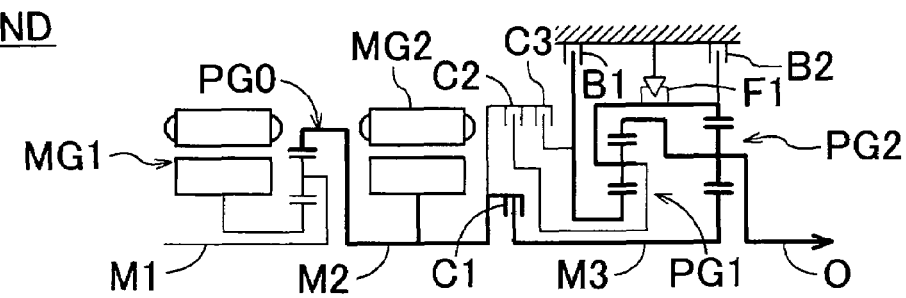
Figure 6:
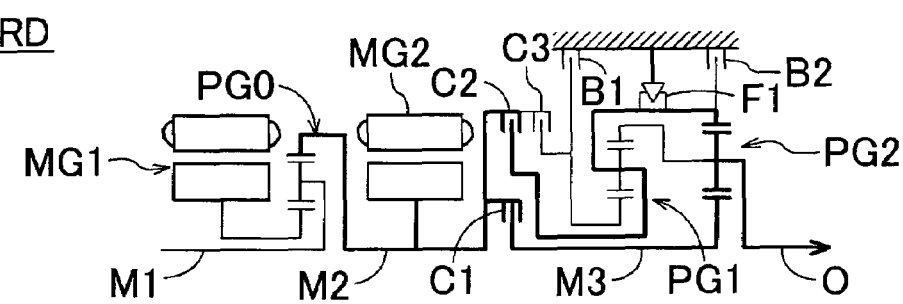
Figure 6:
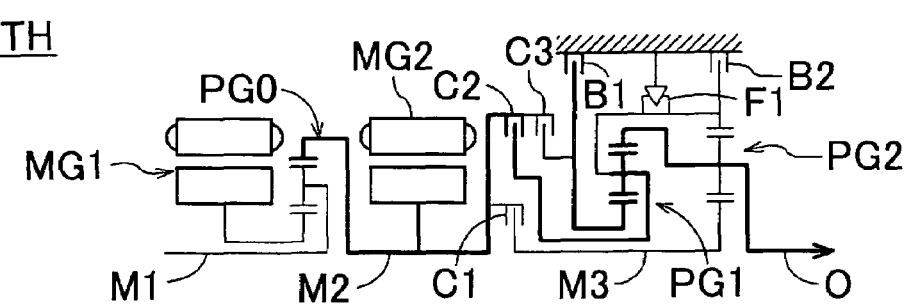
Figure 6:
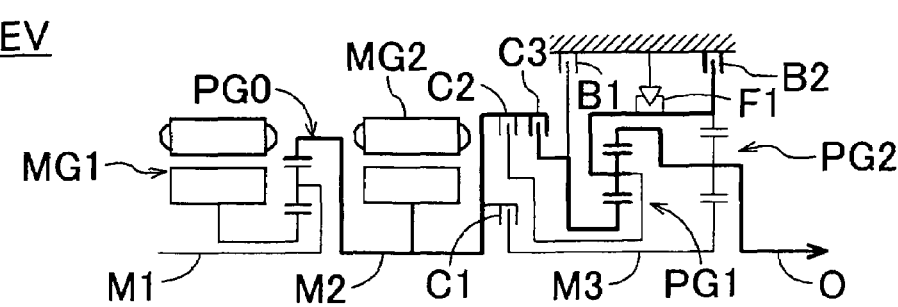

FIG. 6 is a skeleton diagram corresponding to FIG. 3, in which drive transmission is indicated by thick lines. The drive transmission state in the first forward speed, second forward speed, third forward speed, fourth forward speed, and reverse speed are shown in sequence from the upper side of the diagram.

First Forward Speed (1$^{st}$)

At this shift speed, as shown in the operation table of FIG. 4, only the first clutch C1 and one way clutch F1 are engaged. As shown in the top section [of FIG. 6], by engaging the first clutch C1, the rotation of the second intermediate shaft M2 is transmitted to a third intermediate shaft M3. In the second planetary gear PG2, reverse rotation of the ring gear r2 is stopped by the one way clutch F1, and hence the input rotation from the sun gear s2 is reduced in speed and output as the rotation of the carrier ca2.

Second Forward Speed (2$^{nd}$)

At this shift speed, as shown in the operation table of FIG. 4, only the first clutch C1 and the first brake B1 are engaged. As shown in the second section from the top, by engaging the first clutch C1, the rotation of the second intermediate shaft M2 is transmitted to the third intermediate shaft M3. Meanwhile, in relation to the planetary gear set PGS1 constituted by the first planetary gear PG1 and the second planetary gear PG2, rotation of the sun gear s1 in the first planetary gear PG1 is stopped, and hence the input rotation from the sun gear s2 is reduced in speed and output as the rotation of the carrier ca2. The speed reduction ratio in this state is smaller than that of the first forward speed.

Third Forward Speed (3$^{rd}$)

At this shift speed, as shown in the operation table of FIG. 4, only the first clutch C1 and the second clutch C2 are engaged. As shown in the third section from the top, by engaging the first clutch C1, the rotation of the second intermediate shaft M2 is transmitted to the third intermediate shaft M3. Meanwhile, by engaging the second clutch C2, the rotation speeds of the sun gear s2 and ring gear r2 are identical in relation to the second planetary gear PG2, and hence the planetary gear PG2 is fixed. As a result, the rotation of the second intermediate shaft M2 is output as is to the output shaft O, leading to a so-called direct coupling state.

Fourth Forward Speed (4$^{th}$)

At this shift speed, as shown in the operation table of FIG. 4, only the second clutch C2 and the first brake B1 are engaged. As shown in the second section from the bottom, by engaging the second clutch C2, the rotation of the second intermediate shaft M2 is transmitted to the carrier ca1 of the first planetary gear PG1. In the first planetary gear PG1, rotation of the sun gear s1 is stopped by the first brake B1, and hence the input rotation from the carrier ca1 is increased in speed and output as the rotation of the ring gear r1.

In this state, the rotation of the second intermediate shaft M2 is increased in speed and transferred to the carrier ca2 of the second planetary gear PG2, and hence the third intermediate shaft M3 (in the speed diagram, the fourth rotary element rm4 corresponding to the fourth vertical line from the left), which serves as an output side transfer member of the first clutch C1 and is provided with the sun gear s2 of the second planetary gear PG2, rotates at an extremely high speed. In this embodiment, however, the third intermediate shaft M3 is provided in the axial position of the transmission SC and therefore receives the effects of centrifugal force and the like. Therefore, situations in which the clutch input/output members come into contact, leading to deterioration of the traveling performance, can be suppressed.

Reverse (REV)

At this shift speed, as shown in the operation table of FIG. 4, only the third clutch C3 and the second brake B2 are engaged. As shown in the bottom section, by engaging the third clutch C3, the rotation of the second intermediate shaft M2 is transmitted to the sun gear s1 of the first planetary gear PG1. In the first planetary gear PG1, rotation of the carrier ca1 is stopped by the second brake B2, and hence the input rotation from the sun gear s1 is reversed and output as the rotation of the ring gear r1.

Figure 7:
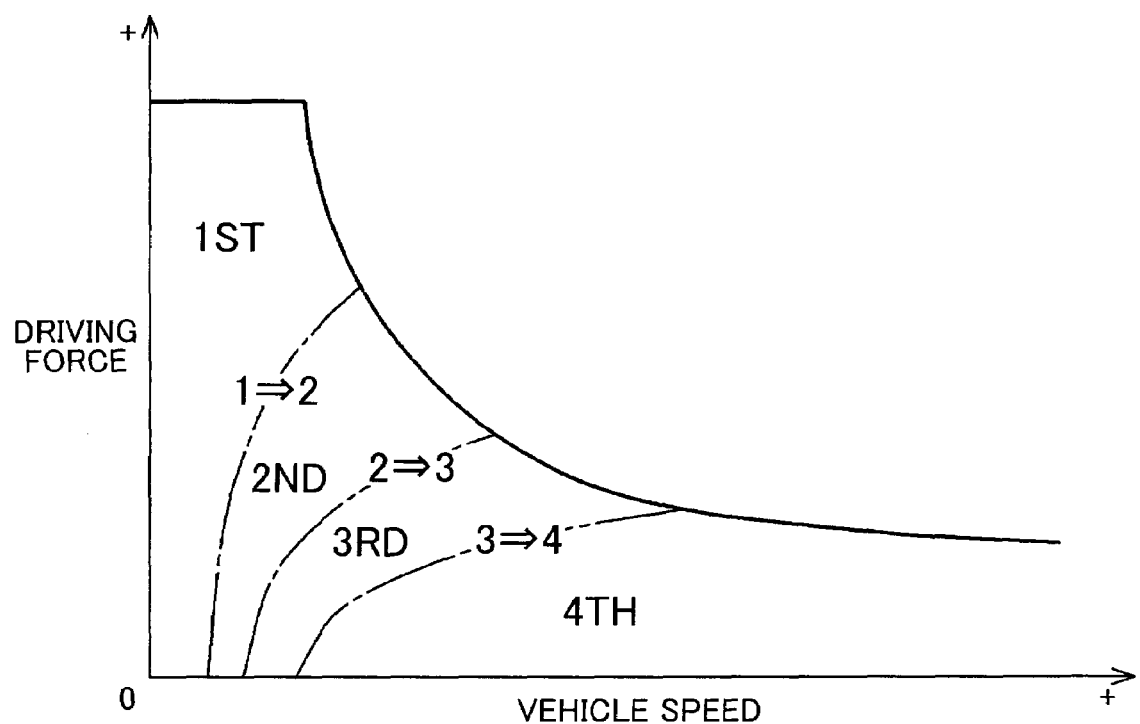
FIG. 7 is a driving force diagram of the first embodiment.

FIG. 7 shows the shifting states of the hybrid drive apparatus according to the present invention, which is capable of the four-speed shifting described above.

The abscissa shows the vehicle speed and the ordinate shows the driving force. The three dot-dash lines extending to the upper right from the lower side show the shifting boundaries accompanying increases in the vehicle speed. The shift speed shown on the left side of the arrow in the drawing indicates the shift speed prior to shifting, and the shift speed shown on the right side of the arrow indicates the shift speed after shifting. In the aforementioned electronic control unit ECU, the shift speed to which shifting is to be performed in the transmission SC is determined on the basis of a map such as that shown in the drawing, and the friction engagement elements are controlled appropriately. As a result, the load on the motor side can be reduced, and hence a compact apparatus can be used.

The drive transmission states accompanying shifting in this embodiment were described above. Below, referring to FIG. 2, the positional relationships between the planetary gear set PGS1 and the friction engagement elements, and the housing relationships between the friction engagement elements within the transmission case MC, will be described.

As is evident from the drawing, in the hybrid drive apparatus HE of the present application, multiple disc clutches and brakes are employed as the clutches C1, C2, C3 and brakes B1, B2.

The clutches C1, C2, C3 are structured such that drive transmission between a clutch input member (for example, a clutch drum) and a clutch output member (a clutch hub corresponding to the clutch drum) is realized in an engaged state by pressing a plurality of friction discs provided on the clutch hub ch side against a plurality of friction partner discs provided on the clutch drum side through the sliding of a piston which is moved axially by oil pressure. In a disengaged state, drive transmission does not occur.

The brakes B1, B2 are structured such that rotation of a rotary member coupled to a brake hub bh is halted by pressing a plurality of friction discs provided on the brake hub bh side against a plurality of friction partner discs provided on the transmission case MC side using a piston which is moved axially by oil pressure.

In this example, the one way clutch F1 is a sprag type one way clutch in which a sprag is provided between an outer race o1 fixed to an inner peripheral surface of a brake cylinder bc in which a piston p of the first brake B1 is housed slidably, and an inner race i1 coupled to the brake hub bh, which is integrated with the carrier ca1 of the first planetary gear PG1.

To describe the arrangement of the friction engagement elements, the first clutch C1 is disposed on the inner diameter side (on the inner diameter side of the second clutch C2, the third clutch C3, the first brake B1, and the second brake B2) in a substantially central location in the axial direction between the second motor MG2 and the planetary gear set PGS1.

The second clutch C2, the third clutch C3, the first brake B1, and the second brake B2 are disposed in succession from the second motor MG2 side on the outer diameter side of the first clutch C1. The one way clutch F1 is disposed on the inner diameter side of the brake cylinder bc of the first brake B1 between the first clutch C1 and the planetary gear set PGS1.

As is evident from FIG. 2, the transmission case MC is structured such that the width thereof in the radial direction decreases from the input shaft I side to the output shaft O side.

Hence, with respect to the relationship between the radial direction outside position of the second motor MG2 and the aforementioned radial direction outside position of the second clutch C2, the third clutch C3, the first brake B1, and the second brake B2, the latter is further toward the inside than the former, and therefore a hybrid drive apparatus which decreases in width toward the output shaft O side is realized.

Moreover, the second clutch C2, the third clutch C3, the first brake B1, and the second brake B2 are disposed on the outside of the first clutch C1 in the radial direction, and the second clutch C2, the third clutch C3, and the first brake B1 overlap the first clutch C1 in the axial direction (a positional overlap region exists therebetween). Hence, a compact structure is also realized in the axial direction.

As regards the relationship between the output side transfer element of the first clutch C1 (in this example, the third intermediate shaft M3 (serving as a first transfer member t1 of the present application) which is coupled to the clutch hub ch, provided with the sun gear s2 of the second planetary gear PG2 at an output shaft side end thereof, and serves as the fourth rotary element rm4 of the planetary gear set PGS1), the output side transfer element of the second clutch C2 (in this example, a second transfer member t2 which is coupled to the clutch hub ch, connected to the carrier ca1 of the first planetary gear PG1 at an output shaft side end thereof, and serves as the second rotary element rm2 of the planetary gear set PGS1), and the output side transfer element of the third clutch C3 (in this example, the third transfer member t3 which is coupled to the clutch hub ch, provided with the sun gear s1 of the first planetary gear PG1 at an output shaft side end thereof, and serves as the first rotary element rm1 of the planetary gear set PGS1), these members are coaxial, the third intermediate shaft M3 (first transfer member t1) being provided in the axial center and the second transfer member t2 and the third transfer member t3 being provided in succession on the outside thereof in the radial direction, as is evident from FIG. 2.

In the speed diagram shown on the right side of FIG. 5 and described above, the speed relationship of these members in the fourth forward speed is such that the farther the member is to the inside in the radial direction, the higher its speed is. By employing this arrangement, in a hybrid drive apparatus which generates an overdrive state such as that of the present application, the member M3 (t1) that rotates at the highest speed is disposed on the axial center side, and hence deterioration of the traveling performance caused by contact between the input and output members of the clutch can be suppressed.

Second Embodiment

Figure 8:
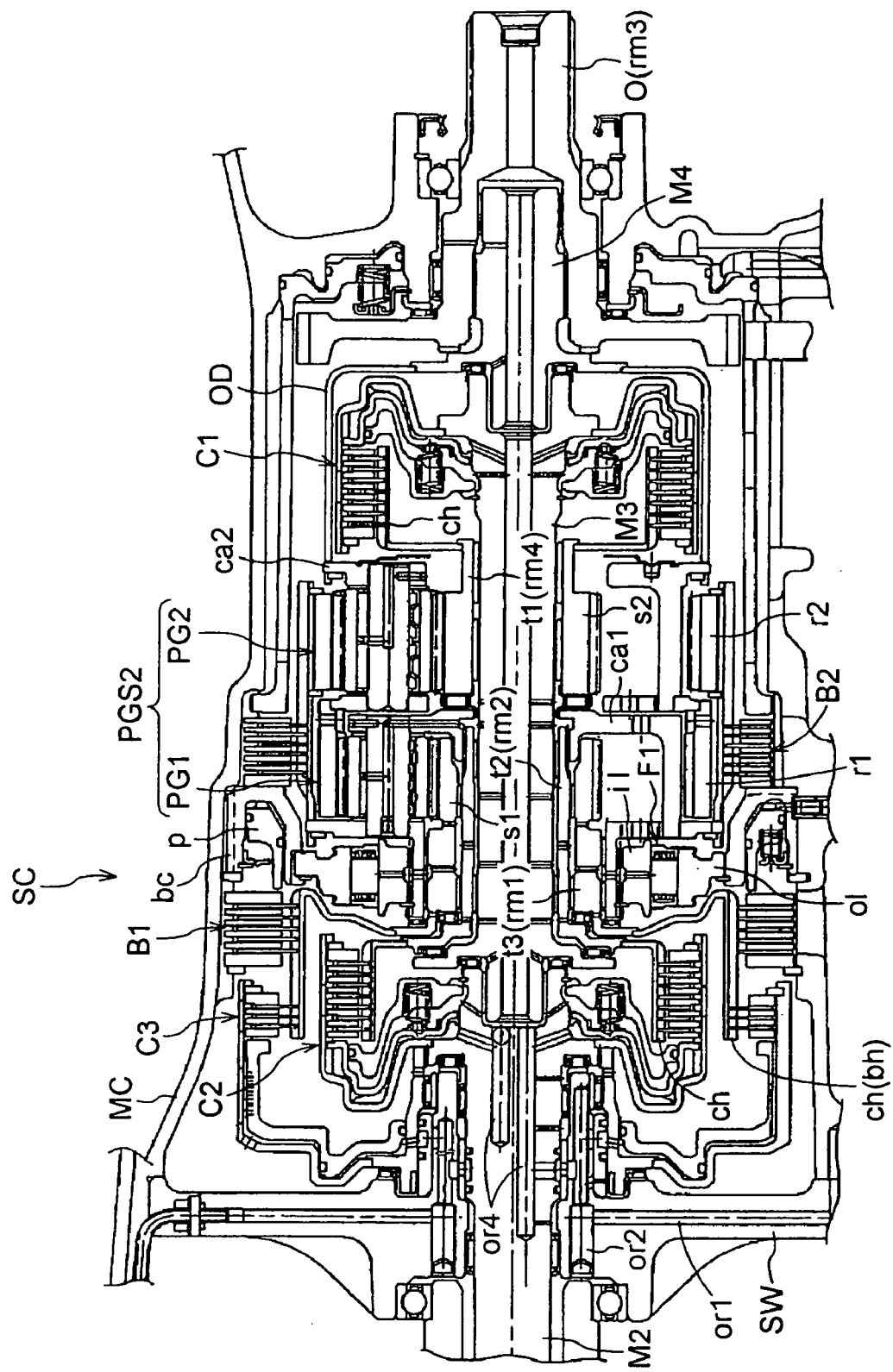
FIG. 8 is a view showing a detailed structure in the vicinity of a transmission of a second embodiment.
Figure 9:
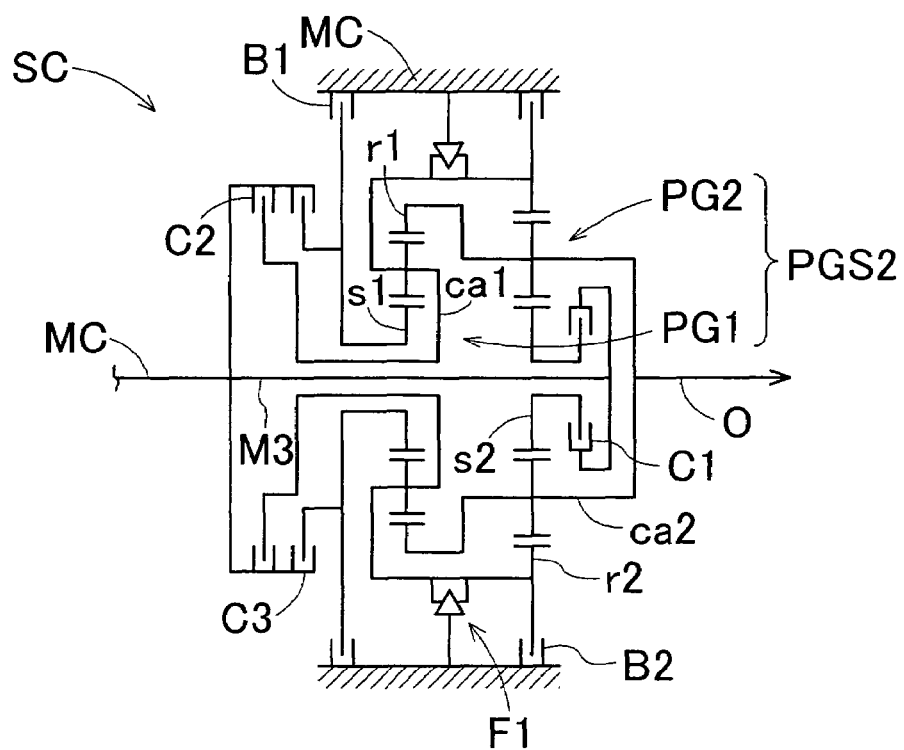
FIG. 9 is a skeleton diagram of the second embodiment.

The specific structure of the downstream side including the transmission SC in this embodiment is shown in FIG. 8, and a skeleton diagram thereof is shown in FIG. 9. This embodiment differs from the first embodiment in that in the first embodiment, the first clutch C1 is disposed between the second motor MG2 and the planetary gear set PGS1, whereas in this embodiment, the first clutch C1 is disposed on the output shaft O side of a planetary gear set PGS2.

In this example, the second intermediate shaft M2 and the third intermediate shaft M3 are connected by a spline so as to rotate integrally. The output from the carrier ca2 of the second planetary gear PG2 is transferred to the output shaft O via an output drum OD, which is provided to be capable of rotating integrally with the carrier ca2, and a fourth intermediate shaft M4.

Accordingly, the skeleton diagram is structured as shown in FIG. 9, and an operation table of the friction engagement elements is similar to that shown in FIG. 4. A speed diagram is similar to that shown on the right side of FIG. 5.

Below, referring to FIG. 8, the positional relationships between the planetary gear set PGS2 of this embodiment and the friction engagement elements C1, C2, C3, B1, B2, F1, and the housing relationships thereof within the transmission case MC, will be described.

In this embodiment, the planetary gear set PGS2 is provided as a shifting planetary gear set, and the friction engagement elements are disposed so as to sandwich the planetary gear set PGS2.

More specifically, as shown in FIG. 8, the second clutch C2 is disposed between the second motor MG2 and the planetary gear set PGS2 on the inner diameter side thereof (on the inner diameter side of the third clutch C3, the first brake B1, and the second brake B2), and the third clutch C3, the first brake B1, and the second brake B2 are disposed on the outer diameter side thereof. Meanwhile, the first clutch C1 is disposed on the opposite side (the output shaft O side) of the planetary gear set PGS2 to the aforementioned friction engagement elements.

The one way clutch F1 is disposed between the second clutch C2 and the planetary gear set PGS2 on the inner diameter side of a brake cylinder bc of the first brake B1.

Likewise in this example, the transmission case MC of the hybrid drive apparatus HE is structured such that the width thereof in the axial radial direction decreases from the input shaft I side to the output shaft O side.

With respect to the relationship between the radial direction outside position of the second motor MG2 and the aforementioned radial direction outside position of the third clutch C3, the first brake B1, and the second brake B2, the latter is further toward the inner diameter side than the former, and therefore a hybrid drive apparatus which decreases in width in the radial direction is realized.

Moreover, the third clutch C3, the first brake B1, and the second brake B2 are disposed on the outside of the second clutch C2 in the radial direction, while the third clutch C3 and the first brake B1 overlap the second clutch C2 in the axial direction (a positional overlap region exists therebetween), and hence a compact structure is also realized in the axial direction.

Below, the relationship between the output side transfer element of the first clutch C1 (in this example, the first transfer member t1 which is coupled to the clutch hub ch, provided with the sun gear s2 of the second planetary gear PG2 at an output shaft side end thereof, and serves as the fourth rotary element rm4 of the planetary gear set PGS2), the output side transfer element of the second clutch C2 (in this example, the second transfer member t2 which is coupled to the clutch hub ch, connected to the carrier ca1 of the first planetary gear PG1 at an output shaft side end thereof, and serves as the second rotary element rm2 of the planetary gear set PGS2), and the output side transfer element of the third clutch C3 (in this example, the third transfer member t3 which is coupled to the clutch hub ch, provided with the sun gear s1 of the first planetary gear PG1 at an output shaft side end thereof, and serves as the first rotary element rm1 of the planetary gear set PGS2) will be described.

As is evident from FIG. 8, the third intermediate shaft M3, the first transfer member t1, the second transfer member t2, and the third transfer member t3 are disposed coaxially such that the third intermediate shaft M3 is disposed in the axial center, and the first transfer member t1 and the second transfer member t2 are disposed in different axial positions on the outside of the third intermediate shaft M3 in the radial direction. The third transfer element t3 is disposed on the outside of the second transfer member t2 in the radial direction. The second transfer member t2 and the third transfer member t3 are capable of outputting drive from the left side to the right side of the drawing, while the first transfer member t1 is capable of outputting drive from the right side to the left side of the drawing.

In the speed diagram of FIG. 5 described above, the speed relationship between these members in the fourth forward speed is such that the first transfer member t1 reaches the highest speed. By employing this arrangement, in a hybrid drive apparatus which generates an overdrive state such as that of the present application, the member which rotates at the highest speed is disposed as close to the axial center as possible, and therefore deterioration of the traveling performance caused by contact between the input and output members of the clutch can be suppressed.

Third Embodiment

First, drive transmission in this embodiment will be described on the basis of FIG. 10, which is a skeleton diagram of the third embodiment, FIG. 4, which is an operation table of the friction engagement elements, and FIG. 11, which is a speed diagram.

In this embodiment also, a pair of planetary gears PG constituting a planetary gear set PGS3, which serves as a shifting planetary gear set, are referred to as the first planetary gear PG1 and the second planetary gear PG2, in order from the second intermediate shaft M2, which serves as the input member of the transmission SC, to the output shaft O, and each of these planetary gears is a single planetary gear including a sun gear s1, s2, a carrier ca1, ca2, and a ring gear r1, r2.

To describe the relationships between the planetary gears and the friction engagement elements, the ring gear r1 of the first planetary gear PG1 is fixed selectively to the transmission case MC by the first brake B1. The carrier ca1 of the first planetary gear PG1 is coupled to the ring gear r2 of the second planetary gear PG2 such that the rotation of the second intermediate shaft M2 is transferred thereto by the second clutch C2, and selectively fixed to the transmission case MC by the second brake B2. Also similarly to the previous example, the rotation of the carrier ca1 is prevented from reversing by the one way clutch F1.

Further, the sun gear s1 of the first planetary gear PG1 is coupled to the sun gear s2 of the second planetary gear PG2 such that the rotation of the intermediate shaft M2 is selectively transferred thereto by the first clutch C1, and the carrier ca2 of the second planetary gear PG2 is drivingly coupled to the output shaft O.

Further, the ring gear r1 of the first planetary gear PG1 is structured such that the rotation of the second intermediate shaft M2 is transferred thereto selectively by the third clutch C3.

Figure 11:
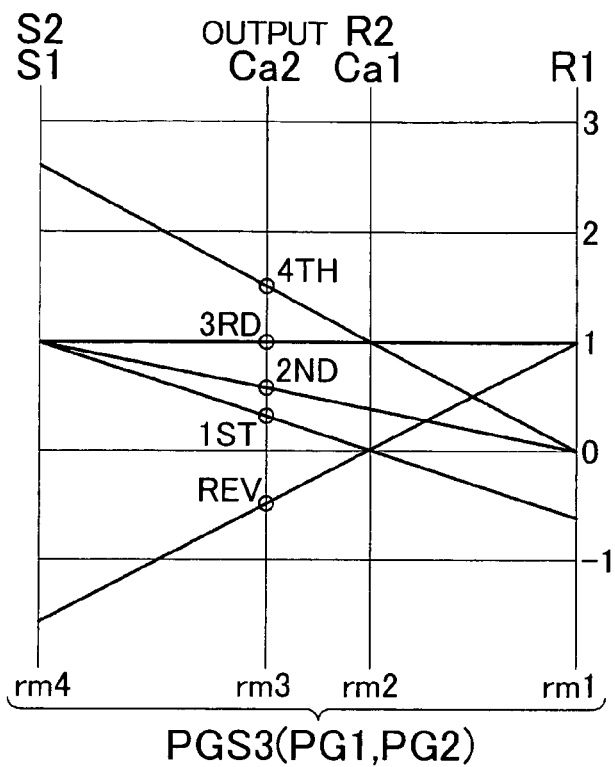
FIG. 11 is a speed diagram of the third embodiment.

FIG. 11 shows a speed diagram of the transmission SC. From this speed diagram, it is possible to confirm the existence of rotary elements which rotate at a speed ranging approximately from a multiple of −1 to a multiple of 2 relative to the engine rotation speed that may be input into the transmission SC in an overdrive state when a speed shift is performed.

The upper side of the speed diagram shows the correspondence between the three elements constituting each planetary gear PG and the vertical lines. "R1, Ca1, S1" correspond to the ring gear r1, carrier ca1, and sun gear s1 of the first planetary gear PG1, respectively, while "R2, Ca2, S2" correspond to the ring gear r2, carrier ca2, and sun gear s2 of the second planetary gear PG2, respectively.

To describe the vertical lines shown in the diagram, a rotary element (serving as the first rotary element rm1 in relation to the planetary gear set PGS3) provided with the ring gear r1 of the first planetary gear PG1, a rotary element (serving as the second rotary element rm2 in relation to the planetary gear set PGS3) structured so as to rotate integrally with the carrier ca1 of the first planetary gear PG1 and provided with the ring gear r2 of the second planetary gear PG2, a rotary element (serving as the third rotary element rm3 in relation to the planetary gear set PGS3) which rotates integrally with the carrier ca2 of the second planetary gear PG2, and a rotary element (serving as a fourth rotary element in relation to the planetary gear set PGS3) provided with the sun gear s1 of the first planetary gear PG1 and the sun gear s2 of the second planetary gear PG2, are positioned in sequence from right to left.

The third rotary element rm3 is integrated with the output shaft O, and hence the rotation speed following shifting by the transmission SC can be learned from the circles drawn on the second vertical line from the left, which denotes the output.

The symbols "$1^{st}$", "$2^{nd}$", "$3^{rd}$", "$4^{th}$", and "REV" are written in relation to the circles on the speed diagram, and correspond to the respective shift speeds. These symbols are differentiated in a similar manner to the first embodiment described above.

As for the ordering of the rotary elements in the planetary gear set PGS3, in the case of forward traveling, numbering advances from the low speed side to the high speed side, and in the case of reverse traveling, numbering advances from the high speed side to the low speed side. In either case, the numerical sequence of the rotary elements does not change.

As is evident from FIG. 10, the relationships between the respective rotary elements of the transmission and the respective friction engagement elements in this embodiment are as follows. The first rotary element rm1 is fixed selectively to the transmission case MC by the first brake B1. The rotation of the intermediate shaft M2 is transferred selectively to the second rotary element rm2 by the second clutch C2, and the second rotary element rm2 is fixed selectively to the transmission case MC by the second brake B2. The third rotary element rm3 is capable of outputting output rotation to the output shaft O. Further, the rotation of the intermediate shaft M2 is transferred selectively to the fourth rotary element rm4 by the first clutch C1. Further, the rotation of the intermediate shaft M2 is also transferred selectively to the first rotary element rm1 by the third clutch C3. These relationships are similar to those described above in the first embodiment.

In this embodiment also, selection of engaged and disengaged states of the respective friction engagement elements is performed in identical combinations to those shown in the operation table of FIG. 4. Hence, in the transmission SC, the various speeds are realized by maintaining any two friction engagement elements in an engaged state and disengaging the remaining two friction engagement elements at each shift speed.

Shifting

Shifting states in this embodiment, having the structure described above, will now be described on the basis of the operation table and the speed diagram.

First Forward Speed (1$^{st}$)

At this shift speed, as shown in the operation table of FIG. 4, only the first clutch C1 and one way clutch F1 are engaged. By engaging the first clutch C1 such that the rotation of the second intermediate shaft M2 is transmitted to the third intermediate shaft M3, this rotation is transmitted to the sun gear s2 of the second planetary gear PG2. In the second planetary gear PG2, reverse rotation of the ring gear r2 is stopped by the one way clutch F1, and hence the input rotation from the sun gear s2 is reduced in speed and output to the output shaft as the rotation of the carrier ca2.

Second Forward Speed (2$^{nd}$)

At this shift speed, as shown in the operation table of FIG. 4, only the first clutch C1 and the first brake B1 are engaged. By engaging the first clutch C1 such that the rotation of the second intermediate shaft M2 is transmitted to the third intermediate shaft M3, this rotation is transmitted to the sun gear s2 of the second planetary gear PG2. Meanwhile, in relation to the planetary gear set PGS3 constituted by the first planetary gear PG1 and the second planetary gear PG2, rotation of the ring gear r1 in the first planetary gear PG1 is stopped, and hence the input rotation from the sun gears s1, s2 is reduced in speed and output to the output shaft O as the rotation of the carrier ca2 in the second planetary gear PG2. The speed reduction ratio in this state is smaller than that of the first forward speed.

Third Forward Speed (3$^{rd}$)

At this shift speed, as shown in the operation table of FIG. 4, only the first clutch C1 and the second clutch C2 are engaged. In this state, by engaging the first clutch C1 such that the rotation of the second intermediate shaft M2 is transmitted to the third intermediate shaft M3, this rotation is transmitted to the sun gear s2 of the second planetary gear PG2. In the first planetary gear PG1, the rotation speeds of the sun gear s1 and the carrier ca1 are identical, and in the second planetary gear PG2, the rotation speeds of the sun gear s2 and the ring gear r2 are identical, and therefore the two planetary gears PG are fixed. As a result, the rotation of the second intermediate shaft M2 is output as is to the output shaft O, leading to a so-called direct coupling state.

Fourth Forward Speed (4$^{th}$)

At this shift speed, as shown in the operation table of FIG. 4, only the second clutch C2 and the first brake B1 are engaged. By engaging the second clutch C2, the rotation of the second intermediate shaft M2 is transmitted to the carrier ca1 of the first planetary gear PG1 and the ring gear r2 of the second planetary gear PG2. In the first planetary gear PG1, rotation of the ring gear r1 is stopped by the first brake B1, and hence the input rotation from the carrier ca1 is increased in speed and output as the rotation of the carrier ca2 of the second planetary gear PG2.

In this state, the rotation of the second intermediate shaft M2 is increased in speed and transferred to the sun gear s1 of the first planetary gear PG1 and the sun gear s2 of the second planetary gear PG2, and hence the first transfer member t1 serving as the output side transfer member of the first clutch C1 (in the speed diagram, the fourth rotary element rm4 corresponding to the vertical line at the left end in the diagram) rotates at an extremely high speed. In this embodiment, however, the first transfer member t1 is provided immediately outside of the third intermediate shaft M3 on the axial center side (inner diameter side) of the transmission, and therefore receives the effects of centrifugal force and the like. As a result, deterioration of the traveling performance caused by contact between the input and output members of the clutch can be suppressed.

Figure 10:
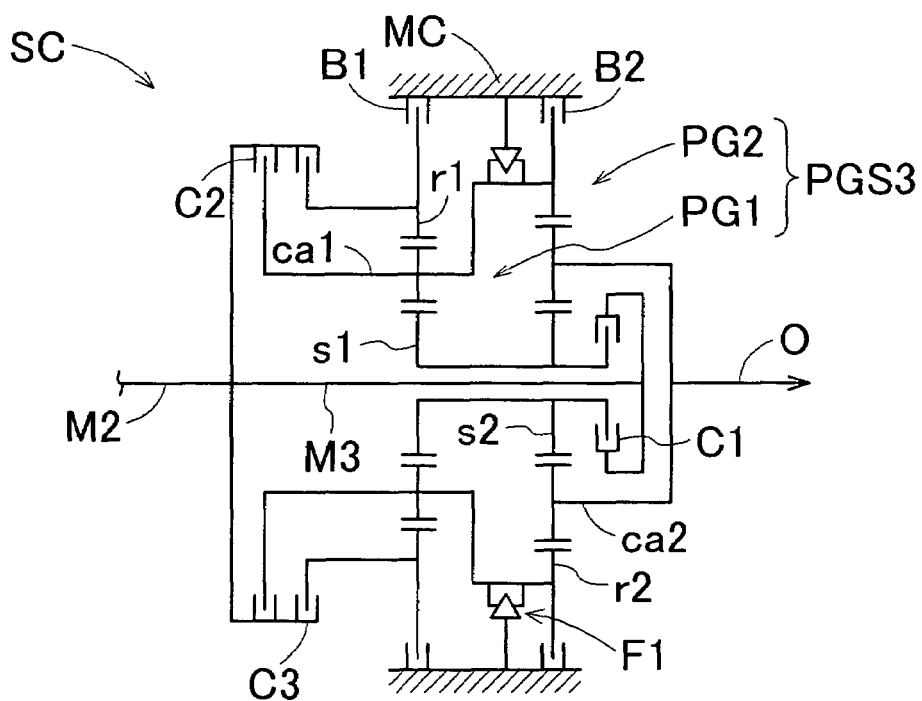
FIG. 10 is a skeleton diagram of a third embodiment.

In the third embodiment, similarly to the second embodiment, this problem is prevented by positioning both the second transfer member t2, which serves as the output side transfer member of the second clutch C2, and the first transfer member t1, which serves as the output side transfer member of the first clutch C1, immediately on the outer diameter side of the third intermediate shaft M3 in the axial diameter direction and in different positions in the axial direction, as shown in FIG. 10.

Reverse (REV)

At this shift speed, as shown in the operation table of FIG. 4, only the third clutch C3 and the second brake B2 are engaged. By engaging the third clutch C3, the rotation of the second intermediate shaft M2 is transmitted to the ring gear r1 of the first planetary gear PG1. In the first planetary gear PG1, rotation of the carrier ca1 is stopped by the second brake B2, and hence the input rotation from the ring gear r1 is reversed and output to the output shaft as the rotation of the carrier ca2 of the second planetary gear PG2.

Fourth Embodiment

In the embodiments described heretofore, the planetary gear sets PGS1, PGS2, PGS3 each include a pair of single planetary gears, and are realized as shifting planetary gear sets by appropriately coupling the respective elements constituting the planetary gears. In the fourth embodiment, however, a so-called Ravigneaux type planetary gear set PGR (PGS4) is used as the shifting planetary gear set.

Figure 12:
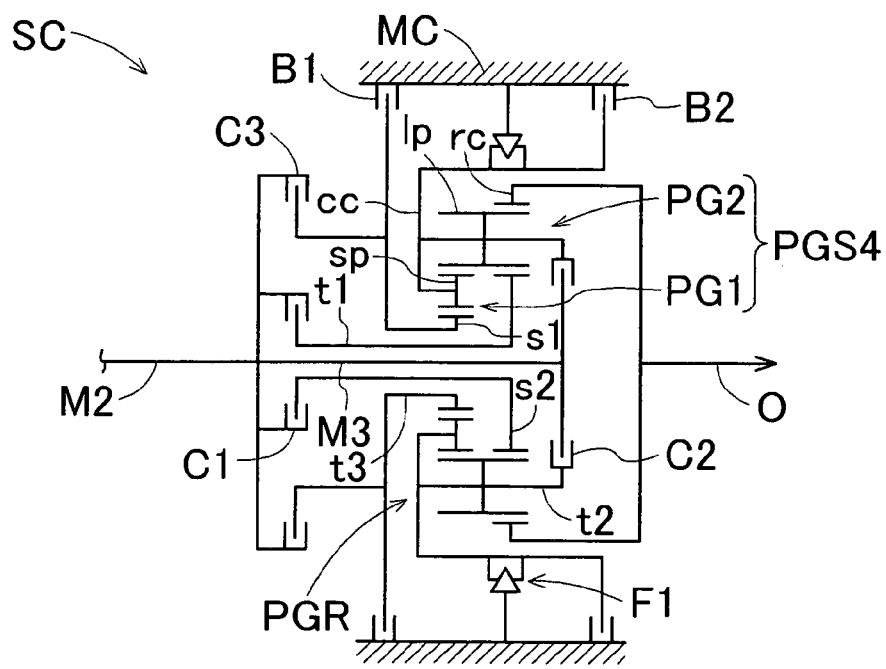
FIG. 12 is a skeleton diagram of a fourth embodiment.

As shown in FIG. 12, the Ravigneaux type planetary gear set PGR includes a common carrier cc and a common ring gear rc in relation to a pair of sun gears s1, s2.

More specifically, the common carrier cc supports a long pinion lp and a short pinion sp. The long pinion lp meshes with the short pinion sp, one of the sun gears s2, and the common ring gear rc, while the short pinion sp meshes with the other sun gear s1.

A first planetary gear PG1 including the other sun gear s1, the common carrier cc, and the common ring gear rc is structured such that the common carrier cc supports the pair of intermeshing pinions rotatably, thereby forming a double pinion type planetary gear.

A second planetary gear PG2 including the first sun gear s2, the common carrier cc, and the common ring gear rc is structured such that the common carrier cc supports a single pinion rotatably, thereby forming a single pinion type planetary gear.

The coupling relationships between the respective elements of the Ravigneaux type planetary gear set PGR and the friction engagement elements will now be described.

As shown in FIG. 12, which is a skeleton diagram of this embodiment, the rotation of the second intermediate shaft M2 is selectively transferred to the sun gear s2 of the second planetary gear PG2 by the first clutch C1. The sun gear s1 of the first planetary gear PG1 is selectively fixed to the transmission case MC by the first brake B1, and the rotation of the second intermediate shaft M2 is selectively transferred thereto by the third clutch C3. The rotation of the second intermediate shaft M2 is also transferred selectively to the common carrier cc by the second clutch C2, and the common carrier cc is selectively fixed to the transmission case MC by the second brake B2. In this case also, the rotation of the common carrier cc is prevented from reversing by the one way clutch F1. Further, the common ring gear rc is drivingly coupled to the output shaft O.

By employing this structure, the states of the first clutch C1, the second clutch C2, the first brake B1, and the second brake B2 are controlled in accordance with the operation table shown in FIG. 4 and described above, and hence the first forward speed, second forward speed, third forward speed, and fourth forward speed can be realized.

The third clutch C3 is also provided in the transmission SC, and by making the third clutch C3 capable of transferring the rotation of the intermediate shaft M2 selectively to the sun gear s1, which is fixed selectively to the transmission case MC by the first brake B1, the reverse speed can be realized in a similar manner to the examples described above.

In this example, a speed diagram is not provided, but with respect to the planetary gear set PGS4 serving as a shifting planetary gear set, the first rotary element provided with the sun gear s1 of the first planetary gear PG1 is fixed selectively to the transmission case MC by the first brake B1, and the rotation of the intermediate shaft M2 is transferred selectively to the second rotary element, which is coupled to the common carrier cc, by the second clutch C2. Further, the third rotary element provided with the common ring gear rc is capable of outputting output rotation to the output shaft O, and the rotation of the intermediate shaft M2 is transferred selectively to the fourth rotary element, which is provided with the sun gear s2 of the second planetary gear PG2, by the first clutch C1.

The rotation of the second intermediate shaft M2 is also transferred selectively to the second rotary element via the third clutch C3 to generate reverse rotation.

The drive transmission states accompanying a speed shift in this embodiment were described above. Below, the positional relationships between the planetary gear set of this embodiment and the friction engagement elements will be described.

In this example, the friction engagement elements are disposed so as to sandwich the planetary gear set PGS4.

More specifically, the first clutch C1 is disposed between the second motor MG2 and the shifting planetary gear set PGS4 on the inner diameter side thereof, and the third clutch C3 and the first brake B1 are disposed on the outer diameter side thereof. Meanwhile, the second clutch C2 is disposed on the opposite side (the output shaft O side) of the planetary gear set PGS4 to the aforementioned friction engagement elements. The second brake B2 is disposed on the outer diameter side of the second clutch C2, and the one way clutch F1 is disposed between the first brake B1 and the second brake B2.

Further, the third clutch C3, the first brake B1, and the second brake B2 are disposed on the outside of the first clutch C1 in the radial direction, while the third clutch C3 overlaps the first clutch C1 in the axial direction (a positional overlap region exists therebetween). Hence, a compact structure is also realized in the axial direction.

In this embodiment, the lower side of the second intermediate shaft M2 exceeds the position of the first clutch C1 and extends to the input position of the second clutch C2 on the output shaft O side of the planetary gear set PGS4.

As regards the relationship between the output side transfer element of the first clutch C1 (the first transfer member t1, which is provided with the sun gear s2 at the output shaft side end thereof and serves as the fourth rotary element of the planetary gear set PGS4), and the output side transfer element of the second clutch C2 (the second transfer member t2, the output shaft side end of which is connected to the carrier cc of the Ravigneaux type planetary gear set, and which serves as the second rotary element of the planetary gear set PGS4), the first transfer member t1 and the second transfer member t2 have identical rotational axes, the third intermediate shaft M3 (which transfers the rotation of the second intermediate shaft M2 to the input side of the second clutch C2) being provided in the axial center, the first transfer member t1 being provided on the outside thereof in the radial direction, and the second transfer member t2 being provided further on the outer diameter side, as is evident from FIG. 12.

As described above, the speed of these members in the fourth forward speed is such that the first transfer member t1 reaches the highest speed. By employing this arrangement, in the hybrid drive apparatus HE which generates an overdrive state such as that of the present application, the member which may rotate at the highest speed is disposed as close to the axial center as possible, and hence deterioration of the traveling performance caused by contact between the input and output members of the clutch, for example, can be suppressed.

The first through fourth embodiments described above realize a hybrid drive apparatus which exhibits the following actions and effects.

1. Although a two-motor split system is employed, the transmission SC has a comparatively simple structure, and therefore acceleration speeds for increasing the input rotation speed and a reverse speed can be realized in the transmission.

2. A state in which the engine rotation speed is increased and input into the transmission can be realized, but in all shift speeds, excessive rotation of the output transfer members of the friction engagement elements can be prevented. This is particularly advantageous in a hybrid drive apparatus with an increased speed ratio, in which the rotation speed of the output transfer members tends to increase.

3. Control to engage and disengage a clutch during shift control and control to disengage and engage another clutch do not have to be performed simultaneously, and hence shift shock is unlikely to occur.

Embodiments with an Increased Number of Shift Speeds

In the embodiments described heretofore, examples of a hybrid drive apparatus which is capable of realizing four forward speeds and one reverse speed in a transmission were provided. In a fifth embodiment and a sixth embodiment to be described below, more shift speeds are realized.

In the fifth embodiment, six forward speeds and one reverse speed are realized, while in the sixth embodiment, eight forward speeds and two reverse speeds are realized.

These embodiments will now be described on the basis of a skeleton diagram, an operation table, and a speed diagram, respectively.

In these embodiments, the structure up to input into the transmission is identical to the structure described above. In other words, the first motor MG1, power distributing planetary gear PG0, and the second motor MG2 are provided in sequence from the engine E side to the output shaft O side such that the rotation of the ring gear r0 of the power distributing planetary gear PG0 is input into the transmission SC. Therefore, a condition in which high-speed rotation in an overdrive state is input may occur.

Fifth Embodiment

Figures 13, 14:
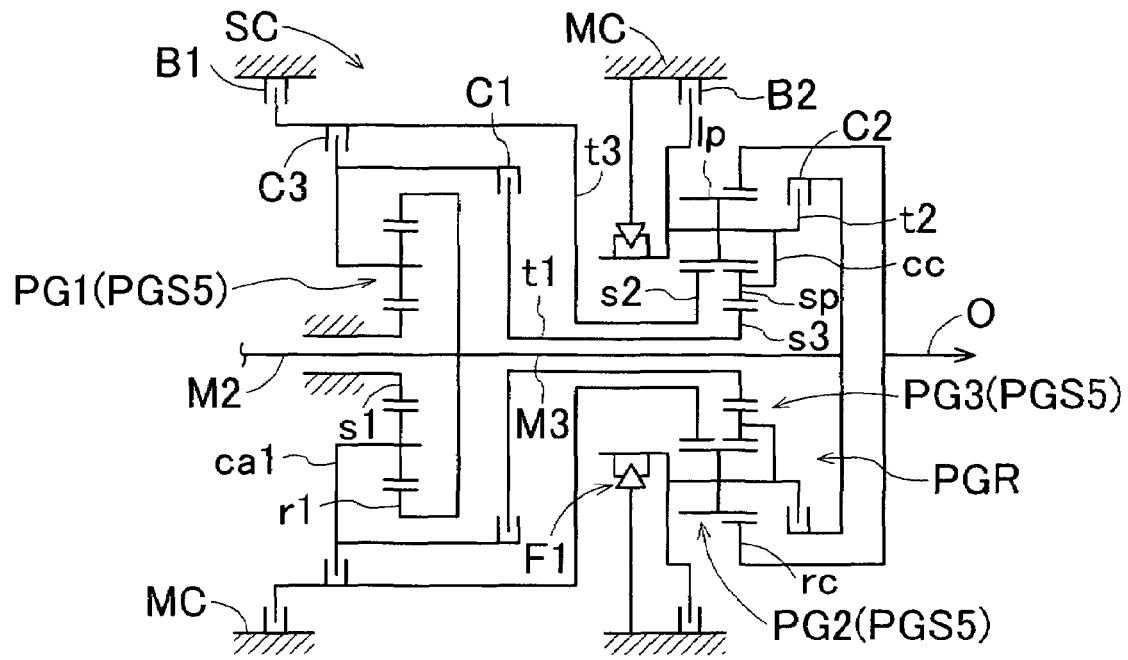
FIG. 13 is a skeleton diagram of a fifth embodiment.
FIG. 14 is an operation table of the fifth embodiment.
Figure 15:
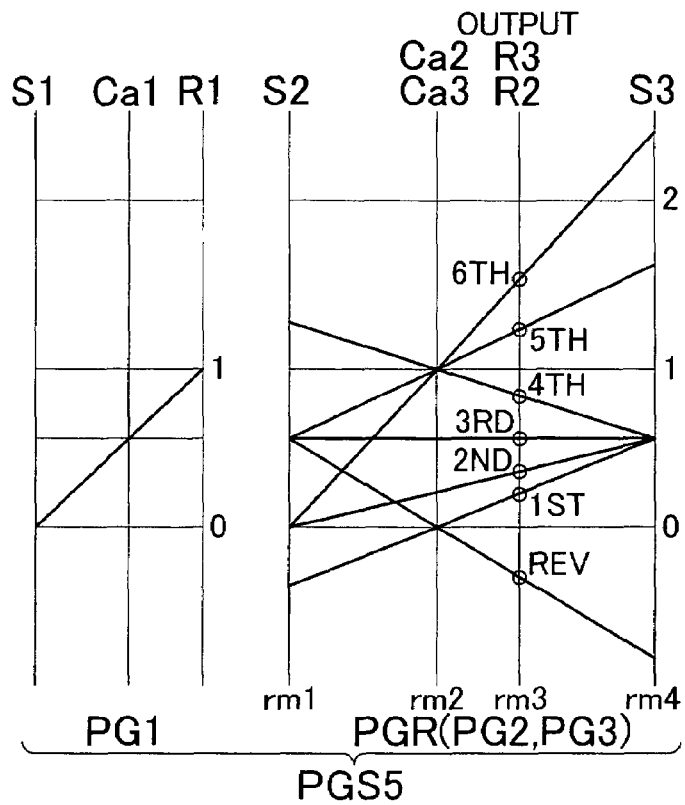
FIG. 15 is a speed diagram of the fifth embodiment.

FIG. 13 is a skeleton diagram of this embodiment, FIG. 14 is an operation table of this embodiment, and FIG. 15 is a speed diagram of this embodiment.

As shown in the skeleton diagram, a planetary gear set PGS5 provided in the transmission SC of this embodiment is constituted by a combination of a first planetary gear PG1 provided on the input side, and a Ravigneaux type planetary gear set PGR provided on the output side. In this example, the Ravigneaux type planetary gear set PGR corresponds to a shifting planetary gear set. The first planetary gear PG1 shifts the speed of the rotation that is input into the transmission SC and transfers the rotation to the shifting planetary gear set.

The first planetary gear PG1 is a single planetary gear including a sun gear s1, a carrier ca1, and a ring gear r1. The Ravigneaux type planetary gear set PGR includes a pair of sun gears s2, s3, a common carrier cc, and a common ring gear rc. The sun gear s1 of the first planetary gear PG1 is fixed to a transmission case MC at all times.

The Ravigneaux type planetary gear set PGR includes the common carrier cc and the common ring gear rc in relation to the pair of sun gears s2, s3. More specifically, the common carrier cc supports a long pinion lp and a short pinion sp, the long pinion lp meshes with the short pinion sp, one of the sun gears s2, and the common ring gear rc, and the short pinion sp meshes with the other sun gear s3. If the planetary gear including the sun gear s2 disposed on the input side, the common carrier cc, and the common ring gear rc is referred to as a second planetary gear PG2, and the planetary gear including the sun gear s3 disposed on the output side, the common carrier cc, and the common ring gear rc is referred to as a third planetary gear PG3, then the second planetary gear PG2 is a single pinion planetary gear and the third planetary gear PG3 is a double pinion type planetary gear.

In the speed diagram shown in FIG. 15, a speed diagram relating to the operational state of the first planetary gear PG1 is shown on the left side, and a speed diagram relating to the operational state of the Ravigneaux type planetary gear set PGR is shown on the right side.

The upper side of the left side speed diagram shows the correspondence between the respective elements constituting the first planetary gear PG1 and the vertical lines. Here, "S1, Ca1, R1" denote a rotary element provided with the sun gear s1 of the first planetary gear PG1, a rotary element coupled to the carrier ca1, and a rotary element provided with the ring gear r1, respectively.

The upper side of the right side speed diagram shows the correspondence between the respective elements constituting the second and the third planetary gears PG2, PG3 and the vertical lines. Here, "S2, Ca2, R2" denote a rotary element provided with the sun gear s2 of the second planetary gear PG2, a rotary element coupled to the carrier cc, and a rotary element provided with the ring gear rc, respectively. "S3, Ca3, R3" denote a rotary element provided with the sun gear s3 of the third planetary gear PG3, a rotary element coupled to the carrier cc, and a rotary element provided with the ring gear rc, respectively. In the Ravigneaux type planetary gear set PGR, the carrier cc and the ring gear rc are shared between the second planetary gear PG2 and the third planetary gear PG3.

Returning to FIG. 13, in this example reduced-speed rotation, which has been reduced in speed by the first planetary gear PG1, is selectively transferred to one of the sun gears (the sun gear s3 of the third planetary gear PG3) by the first clutch C1, and the other sun gear (the sun gear s2 of the second planetary gear PG2) is fixed selectively to the transmission case MC by the first brake B1. Further, the input rotation of the transmission SC is selectively transferred to the carrier cc of the Ravigneaux type planetary gear set PGR by the second clutch C2, and the carrier cc is selectively fixed to the transmission case MC by the second brake B2. Moreover, the ring gear rc of the Ravigneaux type planetary gear set PGS is drivingly coupled to the output shaft O.

Further, a structure is employed whereby reverse rotation of the carrier cc in the Ravigneaux type planetary gear set PGR is stopped by the one way clutch F1, and to realize the reverse speed, the rotation of the carrier cc of the first planetary gear PG1 is selectively transmitted to the sun gear s2 of the second planetary gear PG2 by the third clutch C3.

Shifting

First Forward Speed ($1^{st}$)

At this shift speed, as shown in the operation table of FIG. 14, only the first clutch C1 and one way clutch F1 are engaged. By engaging the first clutch C1, the rotation of the carrier ca1 of the first planetary gear PG1, which is reduced in speed relative to the input speed, is transferred to the first transfer member t1 provided with the sun gear s3 of the third planetary gear set PG3. In the Ravigneaux type planetary gear set PGR, reverse rotation of the common carrier cc is stopped by the one way clutch F1, and hence the input rotation from the sun gear s3 of the third planetary gear set PG3 is reduced in speed and output to the output shaft O as the rotation of the common ring gear rc.

Second Forward Speed ($2^{nd}$)

At this shift speed, as shown in the operation table of FIG. 14, only the first clutch C1 and the first brake B1 are engaged. By engaging the first clutch C1, the rotation of the carrier ca1 of the first planetary gear PG1, which is reduced in speed relative to the input speed, is transferred to the first transfer member t1 provided with the sun gear s3 of the third planetary gear set PG3. In the Ravigneaux type planetary gear set PGR, rotation of the sun gear s2 of the second planetary gear PG2 is stopped by the first brake B1, and hence the input rotation from the sun gear s3 of the third planetary gear set PG3 is reduced in speed and output to the output shaft as the rotation of the common ring gear rc. The speed reduction ratio in this state is smaller than that of the first forward speed.

Third Forward Speed ($3^{rd}$)

At this shift speed, as shown in the operation table of FIG. 14, only the first clutch C1 and the third clutch C3 are engaged. With the rotation of the carrier ca1 in the first planetary gear PG1 transferred to the sun gear s3 of the third planetary gear PG3, the input rotation is transferred to the common carrier cc. As a result, the rotation of the carrier ca1 of the first planetary gear PG1 is transferred as is to the output shaft O.

Fourth Forward Speed ($4^{th}$)

At this shift speed, as shown in the operation table of FIG. 14, only the first clutch C1 and the second clutch C2 are engaged. By engaging the first clutch C1, the rotation of the carrier ca1 of the first planetary gear PG1, obtained by reducing the speed of the input rotation, is transferred to the sun gear s3 of the third planetary gear PG3, while the input rotation of the transmission SC is transferred to the common carrier cc. As a result, rotation which is faster than the rotation of the sun gear s3 and slower than the rotation of the common carrier cc is output as the rotation of the ring gear r3 of the third planetary gear PG3.

Fifth Forward Speed ($5^{th}$)

At this shift speed, as shown in the operation table of FIG. 14, only the second clutch C2 and the third clutch C3 are engaged. By engaging the second clutch C2, the input rotation of the transmission SC is transferred to the common carrier cc, and the rotation of the carrier ca1 in the first planetary gear PG1 is transferred as the rotation of the sun gear s2 of the second planetary gear PG2.

In this state, as regards the third planetary gear PG3, the first transfer member t1 serving as the output side transfer member of the first clutch C1 rotates at an extremely high speed. In this embodiment, however, the first transfer member t1 is provided immediately outside of the intermediate shaft M3 on the axial center side (inner diameter side) of the transmission SC, and therefore receives the effects of centrifugal force and the like. As a result, deterioration of the traveling performance caused by contact between the input and output members of the clutch can be suppressed.

Sixth Forward Speed ($6^{th}$)

At this shift speed, as shown in the operation table of FIG. 14, only the second clutch C2 and the first brake B1 are engaged. By engaging the second clutch C2, the input rotation of the transmission SC is transferred to the common carrier cc. The rotation of the sun gear s2 in the second planetary gear PG2 is stopped by the first brake B1, and therefore rotation which is faster than the rotation of the common carrier cc is output as the rotation of the ring gear rc of the third planetary gear PG3.

This speed increase is larger than that of the fifth forward speed.

In this state, as regards the third planetary gear PG3, the first transfer member t1 serving as the output side transfer member of the first clutch C1 rotates at higher speed than that of the fifth forward speed. However, the first transfer member t1 is provided immediately outside of the intermediate shaft M3 on the axial center side (inner diameter side) of the transmission SV, and therefore receives the effects of centrifugal force and the like. As a result, deterioration of the traveling performance caused by contact between the input and output members of the clutch can be suppressed.

As regards the relationship between the input rotation and output rotation of the transmission SC in this embodiment, the input rotation is transferred from the second intermediate shaft M2 to the ring gear r1 of the first planetary gear PG1, while the output rotation serves as the rotation of the common ring gear rc of the Ravigneaux type planetary gear set PGR. Hence, in the transmission SC, an overdrive state (an acceleration shift speed) is realized in the fifth forward speed and sixth forward speed.

Reverse (REV)

At this shift speed, as shown in the operation table of FIG. 14, only the third clutch C3 and the second brake B2 are engaged. By engaging the third clutch C3, the rotation of the carrier ca1 of the first planetary gear PG1, obtained by reducing the speed of the input rotation, is transmitted to the sun gear s2 of the second planetary gear PG2. In the second planetary gear PG2, rotation of the carrier cc is stopped by the second brake B2, and hence the input rotation from the sun gear s2 is reversed and output to the output shaft as the rotation of the common ring gear rc.

As noted above, in this embodiment, the Ravigneaux type planetary gear set PGR corresponds to the shifting planetary gear set of the present application, and the differences between the first through fourth rotary elements rm1, rm2, rm3, rm4 are shown on the lower side of the vertical lines depicted in the speed diagram of FIG. 15.

Sixth Embodiment

Figure 16:
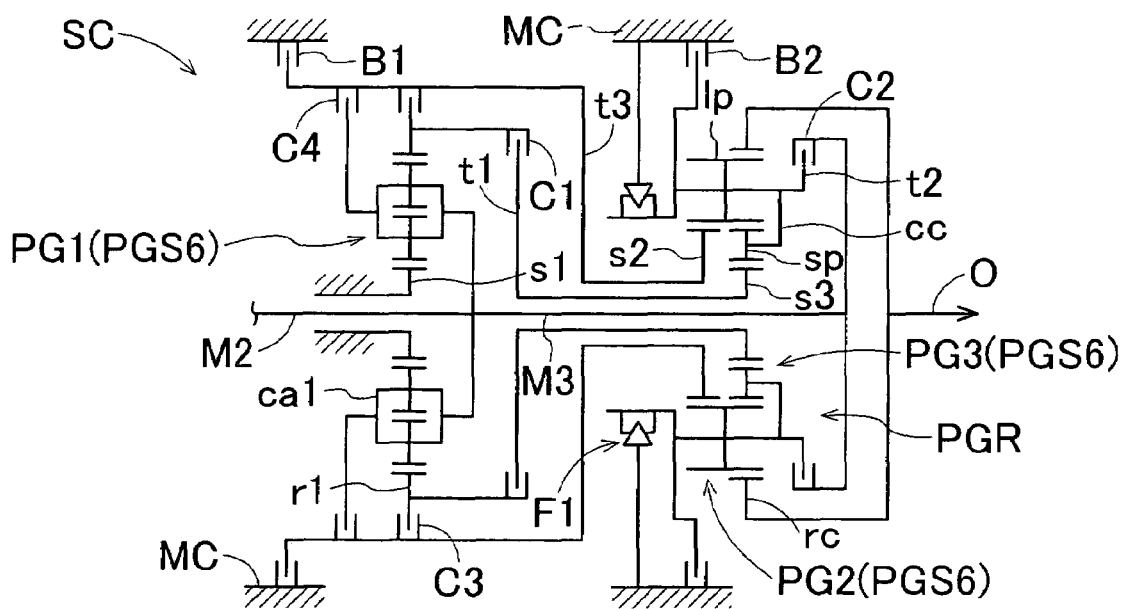
FIG. 16 is a skeleton diagram of a sixth embodiment.
Figures 17, 18:
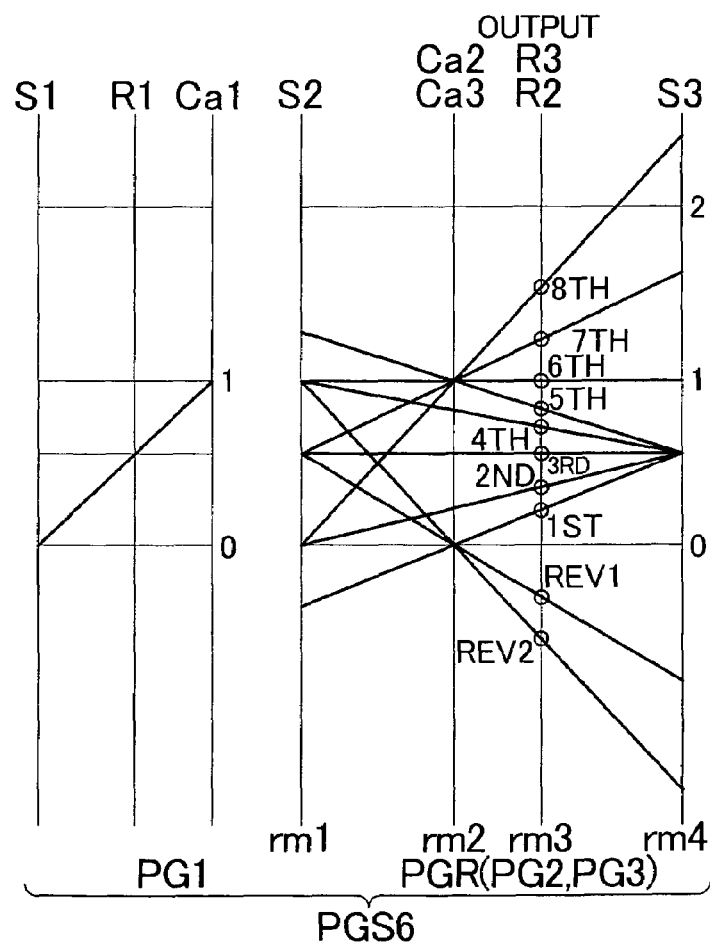
FIG. 17 is an operation table of the sixth embodiment.
FIG. 18 is a speed diagram of the sixth embodiment.

FIG. 16 is a skeleton diagram of this embodiment, FIG. 17 is an operation table of this embodiment, and FIG. 18 is a speed diagram of this embodiment.

As shown in the skeleton diagram, this embodiment, similarly to the fifth embodiment, is constituted by a combination of a first planetary gear PG1 provided on the input side and a Ravigneaux type planetary gear set PGR provided on the output side.

In this example, the first planetary gear PG1 is a double pinion type planetary gear including a sun gear s1, a carrier ca1, and a ring gear r1, in which the carrier ca1 supports a pair of intermeshing pinions rotatably.

The Ravigneaux type planetary gear set PGR includes a common carrier cc and a common ring gear rc in relation to a pair of sun gears s2, s3. Likewise in this example, a structure is employed whereby the common carrier cc supports a long pinion lp and a short pinion sp, the long pinion lp meshes with the short pinion sp, one of the sun gears s2, and the common ring gear rc, and the short pinion sp meshes with the other sun gear s3. The planetary gear including the sun gear s2 disposed on the input side, the common carrier cc, and the common ring gear rc, is referred to as a second planetary gear PG2, and the planetary gear including the sun gear s3 disposed on the output side, the common carrier cc, and the common ring gear rc is referred to as a third planetary gear PG3.

Further, a fourth clutch C4 is newly added to the fifth embodiment, and by means of the fourth clutch C4, the rotation of the carrier ca1 of the first planetary gear PG1, which is also the input rotation of the transmission SC, is transferred selectively to the sun gear s2 of the second planetary gear PG2.

In the speed diagram shown in FIG. 18, the left side shows a speed diagram relating to the operational states of the first planetary gear PG1, while the right side shows a speed diagram relating to the operational states of the Ravigneaux type planetary gear set PGR.

The speed diagram of this embodiment, shown in FIG. 18, corresponds to the diagram of the fifth embodiment, shown in FIG. 15.

Likewise in this example, reduced-speed rotation, which has been reduced in speed by the first planetary gear PG1, is selectively transferred to one of the sun gears (the sun gear s3 of the third planetary gear PG3) by the first clutch C1, and the other sun gear (the sun gear s2 of the second planetary gear PG2) is fixed selectively to the transmission case MC by the first brake B1. Further, the input rotation of the transmission SC is selectively transferred to the carrier cc of the Ravigneaux type planetary gear set PGR by the second clutch C2, and the carrier cc is selectively fixed to the transmission case MC by the second brake B2. Moreover, the ring gear rc of the Ravigneaux type planetary gear set PGR is drivingly coupled to the output shaft O.

Also, reverse rotation of the carrier cc in the Ravigneaux type planetary gear set PGR is stopped by the one way clutch F1, and to realize the reverse speeds, the rotation of the ring gear r1 of the first planetary gear PG1 is selectively transmitted to the sun gear s2 of the second planetary gear PG2 by the third clutch C3.

Further, as described above, a structure is employed whereby the rotation of the carrier ca1 of the first planetary gear PG1, which is also the input rotation of the transmission SC, is transferred selectively to the sun gear s2 of the second planetary gear PG2 by the fourth clutch C4.

Shifting

The shifting operations from the first forward speed ($1^{st}$) to the third forward speed ($3^{rd}$) are substantially identical to the corresponding shift speeds of the fifth embodiment, and hence description thereof has been omitted.

4. Fourth Forward Speed

At this shift speed, as shown in the operation table of FIG. 17, only the first clutch C1 and the fourth clutch C4 are engaged. By engaging the first clutch C1, the rotation of the ring gear r1 of the first planetary gear PG1 is transferred to the first transfer member t1. By engaging the fourth clutch C4, the rotation of the carrier ca1 of the first planetary gear PG1 is output to the output shaft O in a reduced-speed state in the Ravigneaux type planetary gear set PGR.

Fifth Forward Speed ($5^{th}$)

At this shift speed, as shown in the operation table of FIG. 17, only the first clutch C1 and the second clutch C2 are engaged. This state is substantially identical to the fourth forward speed of the fifth embodiment described above, and hence the rotation of the common carrier cc is reduced in speed and output to the output shaft as the rotation of the common ring gear rc.

Sixth Forward Speed ($6^{th}$)

At this shift speed, as shown in the operation table of FIG. 17, only the second clutch C2 and the fourth clutch C4 are engaged. In this operational state, the input rotation of the transmission SC is output directly to the output shaft O as the rotation of the common ring gear rc.

Seventh Forward Speed ($7^{th}$)

At this shift speed, as shown in the operation table of FIG. 17, only the second clutch C2 and the third clutch C3 are engaged. By engaging the second clutch C2, the rotation of the second intermediate shaft M2 is transferred to the common carrier cc, and by engaging the third clutch C3, the rotation of the ring gear r1 in the first planetary gear PG1 is transferred as the rotation of the sun gear s2 of the second planetary gear PG2. As a result, rotation which is increased in speed relative to the rotation of the common carrier cc is output as the rotation of the ring gear rc of the third planetary gear PG3.

In this state, as regards the third planetary gear PG3, the first transfer member t1 serving as the output side transfer member of the first clutch C1 rotates at an extremely high speed. In this embodiment, however, the first transfer member t1 is provided immediately outside of the intermediate shaft M3 on the axial center side (inner diameter side) of the transmission SC, and therefore receives the effects of centrifugal force and the like. As a result, deterioration of the traveling performance caused by contact between the input and output members of the clutch can be suppressed.

Eighth Forward Speed ($8^{th}$)

At this shift speed, as shown in the operation table of FIG. 17, only the second clutch C2 and the first brake B1 are engaged. By engaging the second clutch C2, the rotation of the second intermediate shaft M2 is transferred to the common carrier cc. The rotation of the sun gear s2 in the second planetary gear PG2 is stopped by the first brake B1, and therefore rotation which is faster than the rotation of the common carrier cc is output as the rotation of the ring gear rc.

In this state, as regards the third planetary gear PG3, the first transfer member t1 serving as the output side transfer member of the first clutch C1 rotates at higher speed than that of the seventh forward speed. However, the first transfer member t1 is provided immediately outside of the second intermediate shaft M2 on the axial center side (inner diameter side) of the transmission, and therefore receives the effects of centrifugal force and the like. As a result, deterioration of the traveling performance caused by contact between the input and output members of the clutch can be suppressed.

As regards the relationship between the input rotation and output rotation of the transmission SC in this embodiment, the input rotation is transferred from the second intermediate shaft M2 to the carrier ca1 of the first planetary gear PG1, while the output rotation serves as the rotation of the common ring gear rc of the Ravigneaux type planetary gear set PGR. Hence, in the transmission SC, an overdrive state (an acceleration shift speed) is realized in the seventh forward speed and eighth forward speed.

First Reverse (REV1)

At this shift speed, as shown in the operation table of FIG. 17, only the third clutch C3 and the second brake B2 are engaged. By engaging the third clutch C3, the rotation of the ring gear r1 of the first planetary gear PG1 is transmitted to the sun gear s2 of the second planetary gear PG2. In the second planetary gear PG2, rotation of the common carrier cc is stopped by the second brake B2, and hence the input rotation from the sun gear s2 is reversed and output to the output shaft O as the rotation of the common ring gear rc.

Second Reverse (REV2)

At this shift speed, as shown in the operation table of FIG. 17, only the fourth clutch C4 and the second brake B2 are engaged. By engaging the fourth clutch C4, the rotation of the carrier ca1 of the first planetary gear PG1 is transmitted to the sun gear s2 of the second planetary gear PG2. In the second planetary gear PG2, rotation of the common carrier cc is stopped by the second brake B2, and hence the input rotation from the sun gear s2 is reversed and output to the output shaft as the rotation of the common ring gear rc. This rotation is faster than that of the first reverse speed.

In this embodiment also, the Ravigneaux type planetary gear set PGR corresponds to a shifting planetary gear set. Correspondence between the first through fourth rotary elements rm1, rm2, rm3, rm4 is shown on the lower side of the vertical lines depicted in the speed diagram of FIG. 18.

Further Embodiment of First Embodiment

Seventh Embodiment

Figure 19:
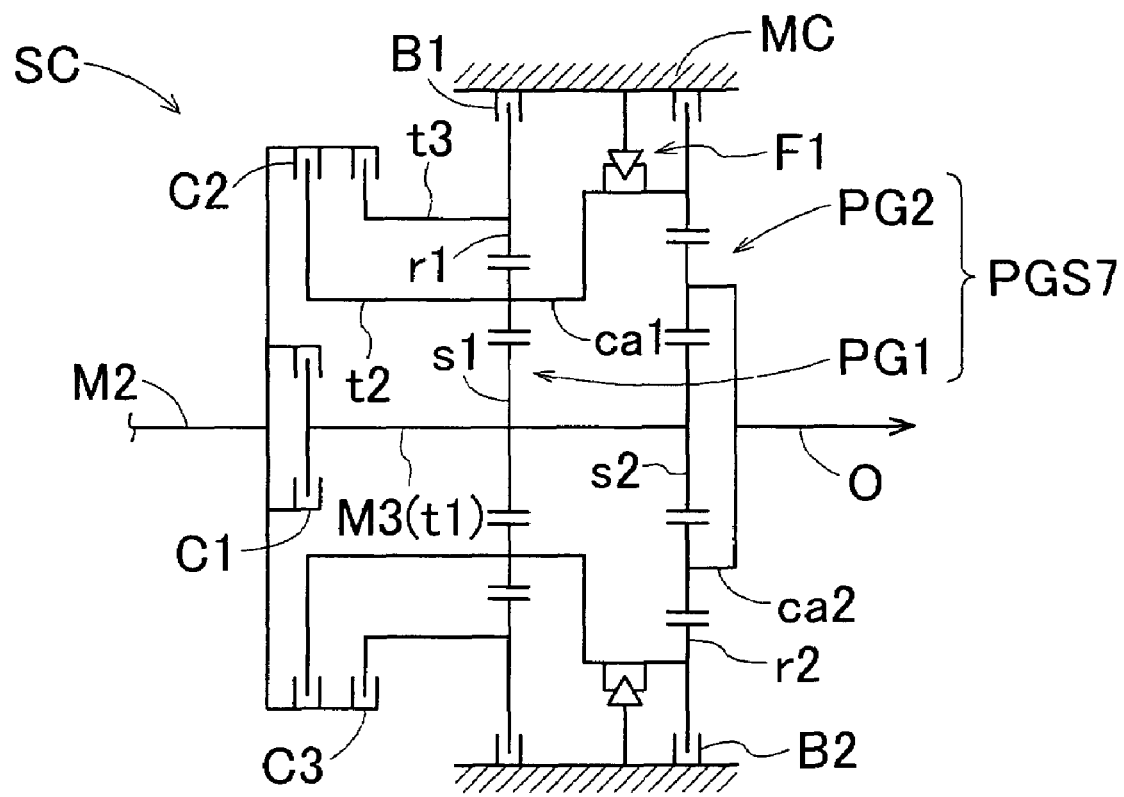
FIG. 19 is a skeleton diagram of another embodiment of the first embodiment.

FIG. 19 shows a skeleton diagram of this embodiment. In this example also, the first clutch C1, the second clutch C2, and the third clutch C3 are provided between the second motor MG2 and the shifting planetary gear set. Furthermore, a planetary gear set PGS7 is constituted by a combination of a pair of single planetary gears PG1, PG2.

To describe this embodiment in comparison with the first embodiment, the relationship between the respective rotary elements of the second planetary gear PG2 and the first clutch C1, the output shaft O, and the second brake B2 are identical, but in this example, the output side transfer member t1 of the first clutch C1 is coupled to the sun gear s1 of the first planetary gear PG1, and the rotation of the second intermediate shaft M2 is selectively transmitted thereto. A structure whereby the rotation of the second intermediate shaft M2 is selectively transmitted to the carrier ca1 from the second clutch C2 is employed, and thus the carrier ca1 rotates integrally with the ring gear r2 of the second planetary gear PG2. As a result, the carrier ca1 also receives the operational control performed by the second brake B2 and the one way clutch F1.

Further, the rotation of the ring gear r1 can be stopped by the first brake B1, and the rotation of the second intermediate shaft M2 is transmitted selectively to the ring gear r1 by the third clutch C3.

Also in this embodiment, four forward speeds and one reverse speed can be realized by activating the friction engagement elements C1, C2, C3, B1, B2, F1 in accordance with the operation table shown in FIG. 4.

In accordance with the description above, the term "connection" includes a structure in which transmission of drive power can be performed directly and also a structure in which transmission of drive power can be performed indirectly via a plurality of members. The term "motor" includes a device that functions as one of a motor and a generator and a device that functions both as a motor and a generator, as required. The term "transfer" includes a state in which rotation is transferred directly without modification, and a state in which rotation is transferred indirectly following a speed increase or a speed reduction. The term "fixed to the case" includes a state in which fixing to the case is performed directly by the brake, and a state in which fixing to the case is performed indirectly by the brake via a member fixed to the case.

Furthermore, the term "transmit" includes a state in which the rotation is directly transferred and a state in which the rotation is indirectly transferred after acceleration or deceleration, and the term "linked" includes a state in which the gears are provided to respective rotary elements. In the case of being "coupled to the intermediate transmission shaft," the rotation of the intermediate transmission shaft is transferred. The phrase "coupled to a non-rotary member" includes a state of being directly fixed, by the brake, to a non-rotary member such as a case or the like, and a state of being indirectly fixed, by the brake, to the non-rotary member, via a member that is fixed to the non-rotary member. In addition, "a state in which the second clutch and the first brake are engaged" means a state in which the clutches and the brake other than the second clutch and the first brake are disengaged. Similarly, "a state in which the first clutch and the first brake are engaged" means a state in which the clutches and the brake other than the first clutch and the first brake are disengaged.

According to an exemplary aspect of the invention, the hybrid drive apparatus employs a two-motor split system, while the transmission includes an acceleration shift speed and a deceleration shift speed. Therefore, the hybrid drive apparatus can respond appropriately to acceleration in a low speed region in the deceleration shift speed and achieve an improvement in fuel efficiency in a high speed region. Moreover, the transmission can respond to a wide speed region, and hence the advantages of a two-motor split system can be exhibited sufficiently while employing a compact motor and achieving a large driving force in the low speed region and an improvement in fuel efficiency in the high speed region. Moreover, by means of the power distributing planetary gear, the driving force of the engine can be increased, the rotation speed of the engine can be increased and input into the transmission, and the increased rotation speed can be further increased by the transmission. As a result, an improvement in energy efficiency and favorable high-speed fuel efficiency can be achieved.

Further, the partition wall is provided between the motor part and the transmission part such that the intermediate transmission shaft passes through the partition wall. Therefore, in a structure in which driving force generated by the engine, the motor, or both can be transmitted to the transmission, it is possible to minimize the possibility that miscellaneous matter that may be present in the transmission part will enter the motor part and affect the operation of the motor.

In the hybrid drive apparatus described above, by activating the second clutch and the first brake, the rotation of the intermediate transmission shaft is transferred to the second rotary element, and by stopping the rotation of the first rotary element, the aforementioned acceleration shift speed is realized. Thus, the rotation speed that is input into the transmission following power distribution can be output to the output shaft from the third rotary element in a state of increased speed. On the other hand, by activating the first clutch and the first brake, the rotation of the intermediate transmission shaft is transferred to the fourth rotary element, and by stopping the rotation of the first rotary element, the aforementioned deceleration speed is realized. Thus, the rotation speed which is input into the transmission following power distribution can be output to the output shaft from the third rotary element in a state of decreased speed.

Furthermore, in a driving state where the increased speed state is realized, the fourth rotary element is forced to rotate at high speed, but since the output side transfer member of the first clutch is coupled to the fourth rotary element on the inner diameter side of the output side transfer member of the second clutch, the effect of this high-speed rotation can be suppressed. As a result, deformation of the first clutch due to centrifugal force and deterioration of the traveling performance caused by contact between the input and output members of the clutch, for example, can be suppressed.

Moreover, by housing the first clutch and the second clutch between the shifting planetary gear set and the second motor, a heavy part constituted by the second motor and planetary gear set can be disposed on either side thereof so as to sandwich the first and second clutches enabling the acquisition of a compact, balanced hybrid drive apparatus.

According to an exemplary aspect of the invention, the motor that can be employed in the hybrid drive apparatus must have a predetermined width, but by keeping the first and second clutches in the positional relationship described above, the size of the hybrid drive apparatus in the radial direction can be held within the outer diameter of the motor at a maximum. Moreover, the first clutch and the second clutch are caused to overlap in the axial direction, and hence the length in the axial direction of the hybrid drive apparatus can be reduced.

According to an exemplary aspect of the invention, the first clutch is disposed on the inner diameter side of the second clutch, and hence a compact structure can be achieved in the radial direction while reducing the length in the axial direction.

According to an exemplary aspect of the invention, the rotation of the intermediate transmission shaft is transferred to the first rotary element by the third clutch, and the rotation of the second rotary element is stopped by the second brake. Thus, a driving force and rotation in an opposite direction to the intermediate transmission shaft can be output to the third rotary element (the output shaft), and reverse travel can be realized by mechanical shifting. As a result, a driving force can be obtained in the reverse speed and reverse travel can be performed with stability over a long time period. Moreover, situations in which a large amount of heat is generated on the motor side during reverse travel can be avoided.

According to an exemplary aspect of the invention, by employing the structure described above, the width of the hybrid drive apparatus in the radial direction and the length thereof in the axial direction can be limited appropriately, and hence a compact hybrid drive apparatus can be obtained.

According to an exemplary aspect of the invention, by disposing the output side transfer member of the first clutch on the inner diameter side of the output side transfer member of the third clutch, this member, which occasionally rotates at high speed, can be prevented from receiving the effects of high-speed rotation, and the resulting problems can be avoided.

According to an exemplary aspect of the invention, in a driving state where the increased speed state is realized, the fourth rotary element is forced to rotate at high speed, but since overlap between the output side transfer member of the first clutch and the output side transfer member of the second clutch can be avoided, the diameter of the output side transfer member of the first clutch can be reduced. As a result, deformation of the first clutch due to centrifugal force and deterioration of the traveling performance caused by contact between the input and output members of the clutch, for example, can be suppressed.

Moreover, by providing the first clutch and the second clutch so as to sandwich the shifting planetary gear set, the selectivity of the clutch position increases, and by disposing the clutch having a comparatively large diameter on one of the shifting planetary gears or the like, a compact and balanced hybrid drive apparatus can be obtained.

According to an exemplary aspect of the invention, by employing the structure described above, a further shift speed in which the first clutch and the second brake are substantially activated can be realized.

The motor that can be employed in the hybrid drive apparatus must be comparatively large and have a predetermined width, but by keeping the first and second clutches in the positional relationship described above, the size of the hybrid drive apparatus in the radial direction can be held within the outer diameter of the motor at a maximum.

According to an exemplary aspect of the invention, a hybrid drive apparatus including an acceleration shift speed and a deceleration shift speed can be realized using a combination of three-element, simple planetary gears or a single Ravigneaux type planetary gear set.

According to an exemplary aspect of the invention, four speed ratios, including the acceleration shift speed and deceleration shift speed, can be realized by controlling the operations of the four friction engagement elements, and while realizing the advantages of a two-motor split system, a structure including a transmission for performing mechanical shifting can be realized and the size of the motor can be reduced. Moreover, the planetary gear set constituting the transmission can be structured from two planetary gears, and the entire hybrid drive apparatus can be made compact in accordance with the reduced size of the motor, achieved through the provision of the transmission, and the size of the transmission itself, which enables the reduction in the size of the motor. Furthermore, a comparatively wide speed region can be responded to favorably, and an improvement in fuel efficiency can be achieved.

According to an exemplary aspect of the invention, a hybrid drive apparatus capable of shifting between four speeds and including an acceleration shift speed and a deceleration shift speed can be realized by a combination of three-element, simple planetary gears or a single Ravigneaux type planetary gear set.

According to an exemplary aspect of the invention, in relation to the first clutch as described heretofore, the forward gear speed having the greatest speed ratio is preferably formed in a transmission state in which the first clutch is engaged such that the rotation of the intermediate transmission shaft is transferred to the fourth rotary element of the shifting planetary gear set.

This structure defines the shift speed to which the first clutch contributes, and the clutch (first clutch) which contributes to the gear speed having the largest speed ratio (speed reduction ratio) requiring the greatest driving force tends to be comparatively large in size.

However, with the hybrid drive apparatus described above, the output side transfer member thereof is disposed on the inner diameter side, and hence a well-balanced arrangement can be realized.

Moreover, four speed ratios, including the acceleration shift speed and deceleration shift speed, can be realized by controlling the operations of the four friction engagement elements, and while realizing the advantages of a two-motor split system, a structure including a transmission for performing mechanical shifting can be sufficiently realized.

Further, in the hybrid drive apparatus, when the shifting planetary gear set is a Ravigneaux type planetary gear set including a common carrier supporting a long pinion and a short pinion, in which the long pinion meshes with the short pinion, a first sun gear, and a common ring gear, and the short pinion meshes with a second sun gear, a hybrid drive apparatus capable of satisfying the object of the present invention can be realized through the use of a compact planetary gear set.

According to an exemplary aspect of the invention, it is impossible to realize a shift speed in which the first clutch and the one way clutch are activated so as to prevent the reverse rotation of the second rotary element of the shifting planetary gear set, as well as another shift speed in which the third clutch and the second brake are activated. As a result, load on the second brake can be reduced as a whole, thereby realizing a stable operation for a long period of time.

According to an exemplary aspect of the invention, by activating the second clutch and the first brake, the rotation of the intermediate transmission shaft is transferred to the second rotary element of the shifting planetary gear set and the rotation of the first rotary element of the shifting planetary gear set is stopped. As a result, the acceleration shift speed is realized, whereby the speed of the rotation input to the transmission after power distribution can be output, in an accelerated state, to the output shaft from the third rotary element of the shifting planetary gear set.

In contrast, by activating the first clutch and the first brake, the rotation of the intermediate transmission shaft is transferred to the fourth rotary element and the rotation of the first rotary element of the shifting planetary gear set is stopped. Thereby, the deceleration shift speed described above is realized so that the speed of the rotation input to the transmission after power distribution can be output, in a decelerated state, to the output shaft from the third rotary element of the shifting planetary gear set.

According to an exemplary aspect of the invention, the rotation of the intermediate transmission shaft is transferred to the first rotary element of the shifting planetary gear set by the third clutch, and the rotation of the second rotary element of the shifting planetary gear set is stopped by the second brake. Thereby, driving force and rotation in a reverse direction to the intermediate transmission shaft can be output to the third rotary element (output shaft) of the shifting planetary gear set, and reverse travel can be realized by mechanical shifting. As a result, a driving force can be obtained in the reverse speed and reverse travel can be performed with stability over a long time period. Moreover, situations in which a large amount of heat is generated on the motor side during reverse travel can be avoided.

According to an exemplary aspect of the invention, the plurality of shift speeds of the transmission include at least an acceleration shift speed in which a rotation speed of the intermediate transmission shaft is increased and output to the output shaft, and a deceleration shift speed in which the rotation speed of the intermediate transmission shaft is decreased and output to the output shaft.

According to an exemplary aspect of the invention, a shift speed can be realized, in which reverse rotation of the second rotary element of the shifting planetary gear set by activating the first clutch and the one way clutch. In addition, another shift speed can be realized, in which the third clutch and the second brake are activated. As a result, load on the second brake can be reduced as a whole, and stable operation can be realized for a long period of time.

The invention claimed is:

1. A hybrid drive apparatus comprising:
    an input shaft that is drivingly coupled to an engine and an output shaft that is drivingly coupled to a wheel;
    a first motor and a second motor;
    a power distributing planetary gear comprising first, second, and third rotary elements, the first motor being connected to the first rotary element, the input shaft being connected to the second rotary element, and an intermediate transmission shaft and the second motor being connected to the third rotary element;
    a transmission having a plurality of shift speeds and that outputs power transferred from the intermediate transmission shaft to the output shaft, wherein the plurality of shift speeds of the transmission comprise at least (1) an acceleration shift speed in which a rotation speed of the intermediate transmission shaft is increased and output to the output shaft, and (2) a deceleration shift speed in which the rotation speed of the intermediate transmission shaft is decreased and output to the output shaft; and
    a partition wall provided between a motor part including the first motor and the second motor and a transmission part including the transmission such that the intermediate shaft passes through the partition wall, wherein:
    the transmission comprises a first brake, a first clutch and a second clutch for transferring the rotation of the intermediate transmission shaft, and a shifting planetary gear set comprising first, second, third, and fourth rotary elements in order of rotation speed,
    the first rotary element is selectively fixed to a case by the first brake,
    the rotation of the intermediate transmission shaft is selectively transferred to the second rotary element by the second clutch,
    the third rotary element is capable of outputting an output rotation to the output shaft,
    the rotation of the intermediate transmission shaft is selectively transferred to the fourth rotary element by the first clutch,
    the first clutch and the second clutch are disposed between the shifting planetary gear set and the second motor, and
    an output side transfer member of the first clutch is coupled to the fourth rotary element of the shifting planetary gear set on an inner diameter side of an output side transfer member of the second clutch.

2. The hybrid drive apparatus according to claim 1, wherein:
    the transmission further comprises a second brake, and the second rotary element of the shifting planetary gear set is selectively fixed to the case by the second brake.

3. The hybrid drive apparatus according to claim 2, wherein:
    the transmission further comprises a third clutch, and
    the rotation of the intermediate transmission shaft is selectively transferred to the first rotary element of the shifting planetary gear set by the third clutch.

4. The hybrid drive apparatus according to claim 3, wherein:
    the third clutch is disposed on a motor side of the shifting planetary gear set and on an inside of a radial direction outer surface of the second motor, and
    the third clutch is disposed so as to overlap one or both of the first clutch and the second clutch in an axial direction.

5. The hybrid drive apparatus according to claim 3, wherein the output side transfer member of the first clutch is coupled to the fourth rotary element of the shifting planetary gear set on an inner diameter side of an output side transfer member of the third clutch.

6. The hybrid drive apparatus according to claim 2, further comprising a one way clutch for preventing reverse rotation of the second rotary element, in addition to the second brake, wherein one of the second brake and the one way clutch is selectively activated.

7. The hybrid drive apparatus according to claim 1, wherein:
    the first clutch and the second clutch are disposed on an inside of a radial direction outer surface of the second motor, and
    at least a part of the first clutch and the second clutch is disposed so as to overlap in an axial direction.

8. The hybrid drive apparatus according to claim 7, wherein the first clutch is disposed on an inner diameter side of the second clutch.

9. The hybrid drive apparatus according to claim 1, wherein:
    the shifting planetary gear set comprises a first planetary gear and a second planetary gear, each having three elements comprising a sun gear, a carrier, and a ring gear,
    the sun gear of the first planetary gear is selectively fixed to the case by the first brake,
    the carrier of the first planetary gear is coupled to the ring gear of the second planetary gear, and the rotation of the intermediate transmission shaft is selectively transferred to the carrier of the first planetary gear by the second clutch,
    the ring gear of the first planetary gear is coupled to the carrier of the second planetary gear and drivingly coupled to the output shaft, and
    the rotation of the intermediate transmission shaft is selectively transferred to the sun gear of the second planetary gear by the first clutch.

10. The hybrid drive apparatus according to claim 1, wherein:
    the shifting planetary gear set comprises a first planetary gear and a second planetary gear, each having three elements comprising a sun gear, a carrier, and a ring gear,
    the ring gear of the first planetary gear is selectively fixed to the case by the first brake, the carrier of the first planetary gear is coupled to the ring gear of the second planetary gear, and the rotation of the intermediate transmission shaft is selectively transferred to the carrier of the first planetary gear by the second clutch, the sun gear of the first planetary gear is coupled to the sun gear of the second planetary gear, and the rotation of the intermediate transmission shaft is selectively transferred to the sun gear of the first planetary gear by the first clutch, and the carrier of the second planetary gear is drivingly coupled to the output shaft.

11. The hybrid drive apparatus according to claim 1, wherein:

the shifting planetary gear set is a Ravigneaux planetary gear set comprising a common carrier supporting a long pinion and a short pinion, in which the long pinion meshes with the short pinion, a first sun gear, and a common ring gear, and the short pinion meshes with a second sun gear, the rotation of the intermediate transmission shaft is selectively transferred to the first sun gear by the first clutch, the second sun gear is selectively fixed to the case by the first brake, the rotation of the intermediate transmission shaft is selectively transferred to the common carrier by the second clutch, and the common ring gear is drivingly coupled to the output shaft.

12. The hybrid drive apparatus according to claim 1, wherein:

the transmission comprises a first brake and a second brake for selectively fixing a rotary element to a case, a first clutch and a second clutch for transferring the rotation of the intermediate transmission shaft, and a shifting planetary gear set comprising first, second, third, and fourth rotary elements, and by setting the first brake, the second brake, the first clutch, and the second clutch in a state of engagement or a state of disengagement, the rotation speed of the intermediate transmission shaft is output to the output shaft in four different speed ratios.

13. The hybrid drive apparatus according to claim 12, wherein:

the shifting planetary gear set is a Ravigneaux planetary gear set comprising a common carrier supporting a long pinion and a short pinion, in which the long pinion meshes with the short pinion, one sun gear, and a common ring gear, and the short pinion meshes with another sun gear, the rotation of the intermediate transmission shaft is selectively transferred to the one sun gear by the first clutch, the other sun gear is selectively fixed to the case by the first brake, the rotation of the intermediate transmission shaft is selectively transferred to the common carrier by the second clutch, and the common carrier is selectively fixed to the case by the second brake, and the common ring gear is drivingly coupled to the output shaft.

14. The hybrid drive apparatus according to claim 1, wherein:

the transmission further comprises a third clutch, and the rotation of the intermediate transmission shaft is selectively transferred to the first rotary element of the shifting planetary gear set by the third clutch.

15. The hybrid drive apparatus according to claim 1, wherein, in a transmission state in which the first clutch is engaged such that a rotation of the intermediate transmission shaft is transferred to the fourth rotary element of the shifting planetary gear set, a forward gear speed having the greatest speed ratio is formed.

16. The hybrid drive apparatus according to claim 1, wherein the shifting planetary gear set is a Ravigneaux planetary gear set comprising a common carrier supporting a long pinion and a short pinion, in which the long pinion meshes with the short pinion, one sun gear, and a common ring gear, and the short pinion meshes with another sun gear.

17. A hybrid drive apparatus comprising:

an input shaft that is drivingly coupled to an engine and an output shaft that is drivingly coupled to a wheel;

a first motor and a second motor;

a power distributing planetary gear comprising first, second, and third rotary elements, the first motor being connected to the first rotary element, the input shaft being connected to the second rotary element, and an intermediate transmission shaft and the second motor being connected to the third rotary element;

a transmission having a plurality of shift speeds and that outputs power transferred from the intermediate transmission shaft to the output shaft, wherein the plurality of shift speeds of the transmission comprise at least (1) an acceleration shift speed in which a rotation speed of the intermediate transmission shaft is increased and output to the output shaft, and (2) a deceleration shift speed in which the rotation speed of the intermediate transmission shaft is decreased and output to the output shaft; and a partition wall provided between a motor part including the first motor and the second motor and a transmission part including the transmission such that the intermediate shaft passes through the partition wall, wherein:

the transmission comprises a first brake and a second brake for selectively fixing a rotary element to a case, a first clutch and a second clutch for transferring the rotation of the intermediate transmission shaft, and a shifting planetary gear set comprising first, second, third, and fourth rotary elements, by setting the first brake, the second brake, the first clutch, and the second clutch in a state of engagement or a state of disengagement, the rotation speed of the intermediate transmission shaft is output to the output shaft in four different speed ratios, the shifting planetary gear set comprises a first planetary gear and a second planetary gear, each having three elements comprising a sun gear, a carrier, and a ring gear, the sun gear of the first planetary gear is selectively fixed to the case by the first brake, the carrier of the first planetary gear is coupled to the ring gear of the second planetary gear, the rotation of the intermediate transmission shaft is selectively transferred to the carrier of the first planetary gear by the second clutch, and the carrier of the first planetary gear is selectively fixed to the case by the second brake, the ring gear of the first planetary gear is coupled to the carrier of the second planetary gear and drivingly coupled to the output shaft, and the rotation of the intermediate transmission shaft is selectively transferred to the sun gear of the second planetary gear by the first clutch.

18. A hybrid drive apparatus comprising:
an input shaft that is drivingly coupled to an engine and an output shaft that is drivingly coupled to a wheel;
a first motor and a second motor;
a power distributing planetary gear comprising first, second, and third rotary elements, the first motor being connected to the first rotary element, the input shaft being connected to the second rotary element, and an intermediate transmission shaft and the second motor being connected to the third rotary element;
a transmission having a plurality of shift speeds and that outputs power transferred from the intermediate transmission shaft to the output shaft, wherein the plurality of shift speeds of the transmission comprise at least (1) an acceleration shift speed in which a rotation speed of the intermediate transmission shaft is increased and output to the output shaft, and (2) a deceleration shift speed in which the rotation speed of the intermediate transmission shaft is decreased and output to the output shaft; and
a partition wall provided between a motor part including the first motor and the second motor and a transmission part including the transmission such that the intermediate shaft passes through the partition wall, wherein:
the transmission comprises first and second brakes, first, second, and third clutches that transmit rotation of the intermediate transmission shaft, and first, second, third, and fourth rotary elements, and has a shifting planetary gear set comprising a first planetary gear and a second planetary gear,
both the first planetary gear and the second planetary gear comprise respective sun gears, carriers, and ring gears thereof,
the first rotary element of the shifting planetary gear set is linked to the sun gear of the first planetary gear,
the second rotary element of the shifting planetary gear set and the ring gear of the second planetary gear are linked to the carrier of the first planetary gear,
the third rotary element of the shifting planetary gear set and the carrier of the second planetary gear are linked to the ring gear of the first planetary gear,
the fourth rotary element is linked to the sun gear of the second planetary gear;
the first rotary element of the shifting planetary gear set is selectively coupled to the intermediate transmission shaft by the third clutch, and is selectively coupled to a non-rotary member by the first brake,
the second rotary element of the shifting planetary gear set is selectively coupled to the intermediate transmission shaft by the second clutch, and is selectively coupled to a non-rotary member by the second brake,
the third rotary element of the shifting planetary gear set is capable of outputting an output rotation to the output shaft,
the fourth rotary element is selectively coupled to the intermediate transmission shaft by the first clutch,
an acceleration shift speed in which the rotation speed of the intermediate transmission shaft is increased and output is realized in a state in which the second clutch and the first brake are engaged, and
a deceleration shift speed in which the rotation speed of the intermediate transmission shaft is decreased and output is realized in a state in which the first clutch and the first brake are engaged.

19. A hybrid drive apparatus comprising:
an input shaft that is drivingly coupled to an engine and an output shaft that is drivingly coupled to a wheel;
a first motor and a second motor;
a power distributing planetary gear comprising first, second, and third rotary elements, the first motor being connected to the first rotary element, the input shaft being connected to the second rotary element, and an intermediate transmission shaft and the second motor being connected to the third rotary element;
a transmission having a plurality of shift speeds and that outputs power transferred from the intermediate transmission shaft to the output shaft, wherein:
the transmission comprises first and second brakes, first, second, and third clutches that transmit rotation of the intermediate transmission shaft, and first, second, third, and fourth rotary elements, and has a shifting planetary gear set comprising a first planetary gear and a second planetary gear,
both the first planetary gear and the second planetary gear comprise respective sun gears, carriers, and ring gears thereof,
the first rotary element of the shifting planetary gear set is linked to the sun gear of the first planetary gear,
the second rotary element of the shifting planetary gear set and the ring gear of the second planetary gear are linked to the carrier of the first planetary gear,
the third rotary element of the shifting planetary gear set and the carrier of the second planetary gear are linked to the ring gear of the first planetary gear,
the fourth rotary element is linked to the sun gear of the second planetary gear,
the first rotary element of the shifting planetary gear set is selectively coupled to the intermediate transmission shaft by the third clutch, and is selectively coupled to a non-rotary member by the first brake,
the second rotary element of the shifting planetary gear set is selectively coupled to the intermediate transmission shaft by the second clutch, and is selectively coupled to a non-rotary member by the second brake,
the third rotary element of the shifting planetary gear set is capable of outputting an output rotation to the output shaft, and
the fourth rotary element is selectively coupled to the intermediate transmission shaft by the first clutch; and
a one way clutch for preventing reverse rotation of the second rotary element, in addition to the second brake, wherein one of the second brake and the one way clutch is selectively activated.

* * * * *

UNITED STATES PATENT AND TRADEMARK OFFICE
CERTIFICATE OF CORRECTION

PATENT NO. : 7,632,201 B2 Page 1 of 1
APPLICATION NO. : 11/586581
DATED : December 15, 2009
INVENTOR(S) : Takami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Second Day of November, 2010

David J. Kappos
*Director of the United States Patent and Trademark Office*